(12) United States Patent
Versace et al.

(10) Patent No.: US 10,846,873 B2
(45) Date of Patent: Nov. 24, 2020

(54) METHODS AND APPARATUS FOR AUTONOMOUS ROBOTIC CONTROL

(71) Applicant: Neurala, Inc., Boston, MA (US)

(72) Inventors: Massimiliano Versace, Boston, MA (US); Anatoly Gorshechnikov, Newton, MA (US)

(73) Assignee: Neurala, Inc., Boston, MA (US)

( * ) Notice: Subject to any disclaimer, the term of this patent is extended or adjusted under 35 U.S.C. 154(b) by 0 days.

(21) Appl. No.: 16/139,466

(22) Filed: Sep. 24, 2018

(65) Prior Publication Data
US 2019/0087975 A1 Mar. 21, 2019

Related U.S. Application Data

(63) Continuation of application No. 15/262,637, filed on Sep. 12, 2016, now Pat. No. 10,083,523, which is a (Continued)

(51) Int. Cl.
*G06K 9/00* (2006.01)
*G06T 7/70* (2017.01)
(Continued)

(52) U.S. Cl.
CPC .............. *G06T 7/70* (2017.01); *G01S 5/16* (2013.01); *G01S 7/41* (2013.01); *G01S 13/86* (2013.01);
(Continued)

(58) Field of Classification Search
CPC ............ G06K 9/3241; G06K 9/00664; G06K 9/6267; G06K 9/00771; G06K 9/3233;
(Continued)

(56) References Cited

U.S. PATENT DOCUMENTS

| 5,063,603 A | 11/1991 | Burt |
|---|---|---|
| 5,136,687 A | 8/1992 | Edelman et al. |

(Continued)

FOREIGN PATENT DOCUMENTS

| EP | 1224622 B1 | 11/2004 |
|---|---|---|
| WO | 2014190208 A2 | 11/2014 |
| WO | 2016014137 A2 | 1/2016 |

OTHER PUBLICATIONS

Rumelhart D., Hinton G., and Williams, R. (1986). Learning internal representations by error propagation. In Parallel distributed processing: explorations in the microstructure of cognition, vol. 1, MIT Press.

(Continued)

*Primary Examiner* — Li Liu
(74) *Attorney, Agent, or Firm* — Smith Baluch LLP

(57) ABSTRACT

Sensory processing of visual, auditory, and other sensor information (e.g., visual imagery, LIDAR, RADAR) is conventionally based on "stovepiped," or isolated processing, with little interactions between modules. Biological systems, on the other hand, fuse multi-sensory information to identify nearby objects of interest more quickly, more efficiently, and with higher signal-to-noise ratios. Similarly, examples of the OpenSense technology disclosed herein use neurally inspired processing to identify and locate objects in a robot's environment. This enables the robot to navigate its environment more quickly and with lower computational and power requirements.

22 Claims, 19 Drawing Sheets

Related U.S. Application Data continuation of application No. PCT/US2015/021492, filed on Mar. 19, 2015.

(60) Provisional application No. 61/955,755, filed on Mar. 19, 2014.

(51) Int. Cl.

| | |
|---|---|
| *G06N 3/00* | (2006.01) |
| *G06N 3/04* | (2006.01) |
| *G06K 9/32* | (2006.01) |
| *G06K 9/46* | (2006.01) |
| *G06K 9/62* | (2006.01) |
| *G01S 5/16* | (2006.01) |
| *G01S 7/41* | (2006.01) |
| *G01S 13/86* | (2006.01) |

(52) U.S. Cl.
CPC ....... *G06K 9/00664* (2013.01); *G06K 9/3241* (2013.01); *G06K 9/4628* (2013.01); *G06K 9/629* (2013.01); *G06N 3/008* (2013.01); *G06N 3/049* (2013.01); *G06N 3/0409* (2013.01); *Y04S 10/54* (2013.01); *Y10S 901/44* (2013.01)

(58) Field of Classification Search
CPC .. G06F 16/5866; G06F 16/58; G06F 16/7837; G06T 7/11
See application file for complete search history.

(56) References Cited

U.S. PATENT DOCUMENTS

| | | | |
|---|---|---|---|
| 5,172,253 A | 12/1992 | Lynne | |
| 5,388,206 A | 2/1995 | Poulton et al. | |
| 6,018,696 A | 1/2000 | Matsuoka et al. | |
| 6,336,051 B1 | 1/2002 | Pangels et al. | |
| 6,647,508 B2 | 11/2003 | Zalewski et al. | |
| 7,765,029 B2 | 7/2010 | Fleischer et al. | |
| 7,861,060 B1 | 12/2010 | Nickolls et al. | |
| 7,873,650 B1 | 1/2011 | Chapman et al. | |
| 8,254,699 B1* | 8/2012 | Zhao | G06K 9/6232 348/699 |
| 8,392,346 B2 | 3/2013 | Ueda et al. | |
| 8,510,244 B2 | 8/2013 | Carson et al. | |
| 8,583,286 B2 | 11/2013 | Fleischer et al. | |
| 8,648,828 B2 | 2/2014 | Katz | |
| 9,031,692 B2 | 5/2015 | Zhu | |
| 9,177,246 B2 | 11/2015 | Buibas et al. | |
| 9,189,828 B2 | 11/2015 | Gorchetchnikov et al. | |
| 9,210,312 B2 | 12/2015 | Sablak et al. | |
| 9,256,807 B1* | 2/2016 | Shlens | G06K 9/6215 |
| 9,626,566 B2 | 4/2017 | Versace et al. | |
| 2002/0046271 A1 | 4/2002 | Huang | |
| 2002/0050518 A1 | 5/2002 | Roustaei | |
| 2002/0056124 A1 | 5/2002 | Hay | |
| 2002/0064314 A1 | 5/2002 | Comaniciu et al. | |
| 2002/0168100 A1 | 11/2002 | Woodall | |
| 2003/0026588 A1 | 2/2003 | Elder et al. | |
| 2003/0078754 A1 | 4/2003 | Hamza | |
| 2004/0015334 A1 | 1/2004 | Ditlow et al. | |
| 2005/0166042 A1 | 7/2005 | Evans | |
| 2006/0045354 A1* | 3/2006 | Hanna | G06K 9/00771 382/224 |
| 2006/0184273 A1 | 8/2006 | Sawada et al. | |
| 2007/0052713 A1 | 3/2007 | Chung et al. | |
| 2007/0198222 A1 | 8/2007 | Schuster et al. | |
| 2007/0279429 A1 | 12/2007 | Ganzer | |
| 2008/0033897 A1 | 2/2008 | Lloyd | |
| 2008/0066065 A1 | 3/2008 | Kim et al. | |
| 2008/0117720 A1 | 5/2008 | Ogasawara | |
| 2008/0258880 A1 | 10/2008 | Smith et al. | |
| 2009/0080695 A1* | 3/2009 | Yang | G06K 9/3241 382/103 |
| 2009/0089030 A1 | 4/2009 | Sturrock et al. | |
| 2009/0116688 A1* | 5/2009 | Monacos | G06K 9/3233 382/100 |
| 2009/0315996 A1* | 12/2009 | Guler | G01S 3/7864 348/169 |
| 2009/0322871 A1* | 12/2009 | Ji | G01S 7/412 348/115 |
| 2010/0048242 A1 | 2/2010 | Rhoads et al. | |
| 2010/0128930 A1* | 5/2010 | Liu | G06K 9/00771 382/103 |
| 2010/0310159 A1* | 12/2010 | Ranganathan | G06K 9/6277 382/161 |
| 2011/0004341 A1 | 1/2011 | Sarvadevabhatla et al. | |
| 2011/0173015 A1 | 7/2011 | Chapman et al. | |
| 2011/0279682 A1 | 11/2011 | Li et al. | |
| 2012/0072215 A1 | 3/2012 | Yu et al. | |
| 2012/0089552 A1 | 4/2012 | Chang et al. | |
| 2012/0197596 A1 | 8/2012 | Comi | |
| 2012/0316786 A1 | 12/2012 | Liu et al. | |
| 2013/0070969 A1* | 3/2013 | Hu | G06K 9/00248 382/107 |
| 2013/0084007 A1* | 4/2013 | Salamati | G06T 7/162 382/173 |
| 2013/0126703 A1 | 5/2013 | Caulfield | |
| 2013/0131985 A1 | 5/2013 | Weiland et al. | |
| 2013/0208948 A1* | 8/2013 | Berkovich | H04N 13/204 382/103 |
| 2014/0019392 A1 | 1/2014 | Buibas et al. | |
| 2014/0032461 A1 | 1/2014 | Weng | |
| 2014/0052679 A1 | 2/2014 | Sinyayskiy et al. | |
| 2014/0089232 A1 | 3/2014 | Buibas et al. | |
| 2014/0192073 A1 | 7/2014 | Gorchetchnikov et al. | |
| 2014/0258195 A1* | 9/2014 | Weng | G06N 3/02 706/19 |
| 2015/0063713 A1* | 3/2015 | Yang | G06K 9/6267 382/225 |
| 2015/0127149 A1 | 5/2015 | Sinyavskiy et al. | |
| 2015/0134232 A1 | 5/2015 | Robinson | |
| 2015/0170000 A1* | 6/2015 | Yang | G06K 9/6267 382/224 |
| 2015/0224648 A1 | 8/2015 | Lee et al. | |
| 2015/0269439 A1 | 9/2015 | Versace et al. | |
| 2016/0075017 A1 | 3/2016 | Laurent et al. | |
| 2016/0082597 A1 | 3/2016 | Gorshechnikov et al. | |
| 2016/0096270 A1 | 4/2016 | Gabardos et al. | |
| 2016/0156823 A1 | 6/2016 | Yoshida et al. | |
| 2016/0198000 A1 | 7/2016 | Gorshechnikov et al. | |
| 2017/0076194 A1 | 3/2017 | Versace et al. | |
| 2017/0193298 A1 | 7/2017 | Versace et al. | |

OTHER PUBLICATIONS

Rumpf, M. and Strzodka, R. Graphics processor units: New prospects for parallel computing. In Are Magnus Bruaset and Aslak Tveito, editors, Numerical Solution of Partial Differential Equations on Parallel Computers, vol. 51 of Lecture Notes in Computational Science and Engineering, pp. 89-134. Springer, 2005.

Salakhutdinov, R., & Hinton, G. E. (2009). Deep boltzmann machines. In International Conference on Artificial Intelligence and Statistics (pp. 448-455).

Schaul, Tom, Quan, John, Antonoglou, Ioannis, and Silver, David. Prioritized experience replay. arXiv preprint arXiv: 1511.05952, Nov. 18, 2015.

Schmidhuber, J. (2010). Formal theory of creativity, fun, and intrinsic motivation (1990-2010). Autonomous Mental Development, IEEE Transactions on, 2(3), 230-247.

Schmidhuber, Jürgen. Curious model-building control systems. In Neural Networks, 1991. 1991 IEEE International Joint Conference on, pp. 1458-1463. IEEE, 1991.

Seibert, M., & Waxman, A.M. (1992). Adaptive 3-D Object Recognition from Multiple Views. IEEE Transactions on Pattern Analysis and Machine Intelligence, 14 (2), 107-124.

Sherbakov, L. and Versace, M. (2014) Computational principles for an autonomous active vision system. Ph.D., Boston University, http://search.proquest.com/docview/1558856407.

(56) References Cited

OTHER PUBLICATIONS

Sherbakov, L. et al. 2012. CogEye: from active vision to context identification, youtube, retrieved from the Internet on Oct. 10, 2017: URL://www.youtube.com/watch?v=i5PQk962B1k, 1 page.

Sherbakov, L. et al. 2013. CogEye: system diagram module brain area function algorithm approx # neurons, retrieved from the Internet on Oct. 12, 2017: URL://http://www-labsticc.univ-ubs.fr/coussy/neucomp2013/index_fichiers/material/posters/NeuComp2013_fina156x36.pdf, 1 page.

Sherbakov, L., Livitz, G., Sohail, A., Gorchetchnikov, A., Mingolla, E., Ames, H., and Versace, M (2013b) A computational model of the role of eye-movements in object disambiguation. Cosyne, Feb. 28-Mar. 3, 2013. Salt Lake City, UT, USA.

Sherbakov, L., Livitz, G., Sohail, A., Gorchetchnikov, A., Mingolla, E., Ames, H., and Versace, M. (2013a) CogEye: An online active vision system that disambiguates and recognizes objects. NeuComp 2013.

Smolensky, P. (1986). Information processing in dynamical systems: Foundations of harmony theory. In D. E.

Snider, G., Amerson, R., Carter, D., Abdalla, H., Qureshi, S., Laveille, J., Versace, M., Ames, H., Patrick, S., Chandler, B., Gorchetchnikov, A., and Mingolla, E. (2010) Adaptive Computation with Memristive Memory. IEEE Computer, vol. 44(2).

Spratling, M. W. (2008). Predictive coding as a model of biased competition in visual attention. Vision Research, 48(12):1391-1408.

Spratling, M. W. (2012). Unsupervised learning of generative and discriminative weights encoding elementary image components in a predictive coding model of cortical function. Neural Computation, 24(1):60-103.

Spratling, M. W., De Meyer, K., and Kompass, R. (2009). Unsupervised learning of overlapping image components using divisive input modulation. Computational intelligence and neuroscience.

Sprekeler, H. On the relation of slow feature analysis and laplacian eigenmaps. Neural Computation, pp. 1-16, 2011.

Sun, Z. et al., Recognition of SAR target based on multilayer auto-encoder and SNN, International Journal of Innovative Computing, Information and Control, vol. 9, No. 11, pp. 4331-4341, Nov. 2013.

Sutton, R. S., and Barto, A. G. (1998). Reinforcement learning: An introduction(vol. 1, No. 1). Cambridge: MIT press.

TEDx Fulbright, Invited talk, Washington DC, Apr. 5, 2014.

Tong, F., Ze-Nian Li, (1995). Reciprocal-wedge transform for space-variant sensing, Pattern Analysis and Machine Intelligence, IEEE Transactions on , vol. 17, No. 5, pp. 500-551. doi: 10.1109/34.391393.

Torralba, A., Oliva, A., Castelhano, M.S., Henderson, J.M. (2006). Contextual guidance of eye movements and attention in real-world scenes: the role of global features in object search. Psychological Review, 113(4).766-786.

U.S. Appl. No. 15/343,673, filed Nov. 4, 2016, Gorchetchnikov et al.

U.S. Appl. No. 15/463,299, filed Mar. 20, 2017, Versace et al.

Van Hasselt, Hado, Guez, Arthur, and Silver, David. Deep reinforcement learning with double q-learning. arXiv preprint arXiv: 1509.06461, Sep. 22, 2015.

Versace, M. (2006) From spikes to interareal synchrony: how attentive matching and resonance control learning and information processing by laminar thalamocortical circuits. NSF Science of Learning Centers PI Meeting, Washington, DC, USA.

Versace, M., (2010) Open-source software for computational neuroscience: Bridging the gap between models and behavior. In Horizons in Computer Science Research,vol. 3.

Versace, M., Ames, H., Léveillé, J., Fortenberry, B., and Gorchetchnikov, A. (2008) KInNeSS: A modular framework for computational neuroscience. Neuroinformatics, 2008 Winter; 6(4):291-309. Epub Aug. 10, 2008.

Versace, M., and Chandler, B. (2010) MoNETA: A Mind Made from Memristors. IEEE Spectrum, Dec. 2010.

Webster, Bachevalier, Ungerleider (1994). Connections of IT areas TEO and TE with parietal and frontal cortex in macaque monkeys. Cerebal Cortex, 4(5), 470-483.

Wiskott, Laurenz and Sejnowski, Terrence. Slow feature analysis: Unsupervised learning of invariances. Neural Computation, 14(4):715-770, 2002.

Wu, Yan & J. Cai, H. (2010). A Simulation Study of Deep Belief Network Combined with the Self-Organizing Mechanism of Adaptive Resonance Theory. 10.1109/CISE.2010.5677265, 4 pages.

Hodgkin, A. L., and Huxley, A. F. 1952. Quantitative description of membrane current and its application to conduction and excitation in nerve. J Physiol 117, pp. 500-544.

Hopfield, J. 1982. Neural networks and physical systems with emergent collective computational abilities. In Proc Natl Acad Sci USA, vol. 79, pp. 2554-2558.

Ilie, A. 2002. Optical character recognition on graphics hardware. Tech. Rep. integrative paper, UNCCH, Department of Computer Science, 9 pages.

International Preliminary Report on Patentability dated Nov. 8, 2016 from International Application No. PCT/US2015/029438, 7 pp.

International Preliminary Report on Patentability in related PCT Application No. PCT/US2014/039162 filed May 22, 2014, dated Nov. 24, 2015, 7 pages.

International Preliminary Report on Patentability in related PCT Application No. PCT/US2014/039239 filed May 22, 2014, dated Nov. 24, 2015, 8 pages.

International Search Report and Written Opinion dated Feb. 18, 2015 from International Application No. PCT/US2014/039162, 12 pages.

International Search Report and Written Opinion dated Feb. 23, 2016 from International Application No. PCT/US2015/029438, 11 pages.

International Search Report and Written Opinion dated Jul. 6, 2017 from International Application No. PCT/US2017/029866, 12 pages.

International Search Report and Written Opinion dated Nov. 26, 2014 from International Application No. PCT/US2014/039239, 14 pages.

International Search Report and Written Opinion dated Sep. 15, 2015 from International Application No. PCT/US2015/021492, 9 pages.

Itti, L., and Koch, C. (2001). Computational modelling of visual attention. Nature Reviews Neuroscience, 2 (3), 194-203.

Itti, L., Koch, C., and Niebur, E. (1998). A Model of Saliency-Based Visual Attention for Rapid Scene Analysis, 1-6.

Jarrett, K., Kavukcuoglu, K., Ranzato, M. A., & LeCun, Y. (Sep. 2009). What is the best multi-stage architecture for object recognition?. In Computer Vision, 2009 IEEE 12th International Conference on (pp. 2146-2153). IEEE.

Khaligh-Razavi, S.-M. et al., Deep Supervised, but Not Unsupervised, Models May Explain IT Cortical Representation, PLoS Computational Biology, vol. 10, Issue 11, 29 pages (Nov. 2014).

Kim, S., Novel approaches to clustering, biclustering and algorithms based on adaptive resonance theory and intelligent control, Doctoral Dissertations, Missouri University of Science and Technology, 125 pages (2016).

Kipfer, P., Segal, M., and Westermann, R. 2004. UberFlow: A GPU-Based Particle Engine. In Proceedings of the SIGGRAPH/Eurographics Workshop on Graphics Hardware 2004, pp. 115-122.

Kolb, A., L. Latta, and C. Rezk-Salama. 2004. "Hardware-Based Simulation and Collision Detection for Large Particle Systems." in Proceedings of the SIGGRAPH/Eurographics Workshop on Graphics Hardware 2004, pp. 123-131.

Kompella, Varun Raj, Luciw, Matthew, and Schmidhuber, J{umlaut over (0)}urgen. Incremental slow feature analysis: Adaptive low-complexity slow feature updating from high-dimensional input streams. Neural Computation, 24 (11):2994-3024, 2012.

Kowler, E. (2011). Eye movements: The past 25years. Vision Research, 51(13), 1457-1483. doi:10.1016/j.visres.2010.12.014.

Larochelle H., & Hinton G. (2012). Learning to combine foveal glimpses with a third-order Boltzmann machine. NIPS 2010, 1243-1251.

(56) References Cited

OTHER PUBLICATIONS

LeCun, Y., Kavukcuoglu, K., & Farabet, C. (May 2010). Convolutional networks and applications in vision. In Circuits and Systems (ISCAS), Proceedings of 2010 IEEE International Symposium on (pp. 253-256). IEEE.

Lee, D. D. and Seung, H. S. (1999). Learning the parts of objects by non-negative matrix factorization. Nature, 401(6755):788-791.

Lee, D. D., and Seung, H. S. (1997). "Unsupervised learning by convex and conic coding." Advances in Neural Information Processing Systems, 9.

Legenstein, R., Wilbert, N., and Wiskott, L. Reinforcement learning on slow features of high-dimensional input streams. PLoS Computational Biology, 6(8), 2010. ISSN 1553-734X.

Léveillé, J., Ames, H., Chandler, B., Gorchetchnikov, A., Mingolla, E., Patrick, S., and Versace, M. (2010) Learning in a distributed software architecture for large-scale neural modeling. BIONETICS10, Boston, MA, USA.

Livitz G., Versace M., Gorchetchnikov A., Vasilkoski Z., Ames H., Chandler B., Leveille J. and Mingolla E. (2011) Scalable adaptive brain-like systems, The Neuromorphic Engineer, : 10.2417/1201101.003500 Feb. 2011.

Livitz, G., Versace, M., Gorchetchnikov, A., Vasilkoski, Z., Ames, H., Chandler, B., Léveillé, J., Mingolla, E., Snider, G., Amerson, R., Carter, D., Abdalla, H., and Qureshi, S. (2011) Visually-Guided Adaptive Robot (ViGuAR). Proceedings of the International Joint Conference on Neural Networks (IJCNN) 2011, San Jose, CA, USA.

Lowe, D.G.(2004). Distinctive Image Features from Scale-Invariant Keypoints. Journal International Journal of Computer Vision archive vol. 60, 2, 91-110.

Lu, Z.L., Liu, J., and Dosher, B.A. (2010) Modeling mechanisms of perceptual learning with augmented Hebbian re-weighting. Vision Research, 50(4). 375-390.

Mahadevan, S. Proto-value functions: Developmental reinforcement learning. In Proceedings of the 22nd international conference on Machine learning, pp. 553-560. ACM, 2005.

Meuth, J.R. and Wunsch, D.C. (2007) A Survey of Neural Computation on Graphics Processing Hardware. 22nd IEEE International Symposium on Intelligent Control, Part of IEEE Multi-conference on Systems and Control, Singapore, Oct. 1-3, 2007, 5 pages.

Mishkin M, Ungerleider LG. (1982). "Contribution of striate inputs to the visuospatial functions of parieto-preoccipital cortex in monkeys," Behav Brain Res, 6 (1): 57-77.

Mnih, Volodymyr, Kavukcuoglu, Koray, Silver, David, Rusu, Andrei A, Veness, Joel, Bellemare, Marc G, Graves, Alex, Riedmiller, Martin, Fidjeland, Andreas K, Ostrovski, Georg, et al. Human-level control through deep reinforcement learning. Nature, 518(7540):529-533, Feb. 25, 2015.

Moore, Andrew W and Atkeson, Christopher G. Prioritized sweeping: Reinforcement learning with less data and less time. Machine Learning, 13(1):103-130, 1993.

Najemnik, J., and Geisler, W. (2009). Simple summation rule for optimal fixation selection in visual search. Vision Research. 49, 1286-1294.

Notice of Allowance dated Dec. 16, 2016 from U.S. Appl. No. 14/662,657.

Notice of Allowance dated Jul. 27, 2016 from U.S. Appl. No. 14/662,657.

Oh, K.-S., and Jung, K. 2004. GPU implementation of neural networks. Pattern Recognition 37, pp. 1311-1314.

Oja, E. (1982). Simplified neuron model as a principal component analyzer. Journal of Mathematical Biology 15(3), 267-273.

Partial Supplementary European Search Report dated Jul. 4, 2017 from European Application No. 14800348.6, 13 pages.

Raijmakers, M.E.J., and Molenaar, P. (1997). Exact ART: A complete implementation of an ART network Neural networks 10 (4), 649-669.

Ranzato, M. A., Huang, F. J., Boureau, Y. L., & Lecun, Y. (Jun. 2007). Unsupervised learning of invariant feature hierarchies with applications to object recognition. In Computer Vision and Pattern Recognition, 2007. CVPR'07. IEEE Conference on (pp. 1-8). IEEE.

Raudies, F., Eldridge, S., Joshi, A., and Versace, M. (Aug. 20, 2014). Learning to navigate in a virtual world using optic flow and stereo disparity signals. Artificial Life and Robotics, DOI 10.1007/s10015-014-0153-1.

Ren, Y. et al., Ensemble Classification and Regression—Recent Developments, Applications and Future Directions, in IEEE Computational Intelligence Magazine, 10.1109/MCI.2015.2471235, 14 pages (2016).

Riesenhuber, M., & Poggio, T. (1999). Hierarchical models of object recognition in cortex. Nature Neuroscience, 2 (11), 1019-1025.

Riesenhuber, M., & Poggio, T. (2000). Models of object recognition. Nature neuroscience, 3, 1199-1204.

Rolfes, T. 2004. Artificial Neural Networks on Programmable Graphics Hardware. In Game Programming Gems 4, A. Kirmse, Ed. Charles River Media, Hingham, MA, pp. 373-378.

Rublee, E., Rabaud, V., Konolige, K., & Bradski, G. (2011). ORB: An efficient alternative to SIFT or SURF. In IEEE International Conference on Computer Vision (ICCV) 2011, 2564-2571.

Ruesch, J. et al. 2008. Multimodal Saliency-Based Bottom-Up Attention a Framework for the Humanoid Robot iCub. 2008 IEEE International Conference on Robotics and Automation, pp. 962-965.

Adelson, E. H., Anderson, C. H., Bergen, J. R., Burt, P. J., & Ogden, J. M. (1984). Pyramid methods in image processing. RCA engineer, 29(6), 33-41.

Aggarwal, Charu C, Hinneburg, Alexander, and Keim, Daniel A. On the surprising behavior of distance metrics in high dimensional space. Springer, 2001.

Al-Kaysi, A. M. et al., A Multichannel Deep Belief Network for the Classification of EEG Data, from Ontology-based Information Extraction for Residential Land Use Suitability: A Case Study of the City of Regina, Canada, DOI 10.1007/978-3-319-26561-2_5, 8 pages (Nov. 2015).

Ames, H, Versace, M., Gorchetchnikov, A., Chandler, B., Livitz, G., Léveillé, J., Mingolla, E., Carter, D., Abdalla, H., and Snider, G. (2012) Persuading computers to act more like brains. In Advances in Neuromorphic Memristor Science and Applications, Kozma, R.Pino,R., and Pazienza, G. (eds), Springer Verlag.

Ames, H. Mingolla, E., Sohail, A., Chandler, B., Gorchetchnikov, A., Léveillé, J., Livitz, G. and Versace, M. (2012) The Animat. IEEE Pulse, Feb. 2012, 3(1), 47-50.

Apolloni, B. et al., Training a network of mobile neurons, Proceedings of International Joint Conference on Neural Networks, San Jose, CA, doi: 10.1109/IJCNN.2011.6033427, pp. 1683-1691 (Jul. 31-Aug. 5, 2011).

Artificial Intelligence as a Service. Invited talk, Defrag, Broomfield, CO, Nov. 4-6, 2013.

Aryananda, L. 2006. Attending to learn and learning to attend for a social robot. Humanoids 06, pp. 618-623.

Baraldi, A. and Alpaydin, E. (1998). Simplified ART: A new class of ART algorithms. International Computer Science Institute, Berkeley, CA, TR-98-004, 1998.

Baraldi, A. and Alpaydin, E. (2002). Constructive feedforward ART clustering networks—Part I. IEEE Transactions on Neural Networks 13(3), 645-661.

Baraldi, A. and Parmiggiani, F. (1997). Fuzzy combination of Kohonen's and ART neural network models to detect statistical regularities in a random sequence of multi-valued input patterns. In International Conference on Neural Networks, IEEE.

Baraldi, Andrea and Alpaydin, Ethem. Constructive feedforward ART clustering networks—part II. IEEE Transactions on Neural Networks, 13(3):662-677, May 2002. ISSN 1045-9227. doi: 10.1109/tnn.2002.1000131. URL http://dx.doi.org/10.1109/tnn.2002.1000131.

Bengio, Y., Courville, A., & Vincent, P. Representation learning: A review and new perspectives, IEEE Transactions on Pattern Analysis and Machine Intelligence, vol. 35 Issue 8, Aug. 2013, pp. 1798-1828.

Berenson, D. et al., A robot path planning framework that learns from experience, 2012 International Conference on Robotics and

(56) References Cited

OTHER PUBLICATIONS

Automation, 2012, 9 pages [retrieved from the internet] URL:http://users.wpi.edu/-dberenson/lightning.pdf.

Bernhard, F., and Keriven, R. 2005. Spiking Neurons on GPUs. Tech. Rep. 05-15, Ecole Nationale des Ponts et Chauss'es, 8 pages.

Besl, P. J., & Jain, R. C. (1985). Three-dimensional object recognition. ACM Computing Surveys (CSUR), 17(1), 75-145.

Boddapati, V., Classifying Environmental Sounds with Image Networks, Thesis, Faculty of Computing Blekinge Institute of Technology, 37 pages (Feb. 2017).

Bohn, C.-A. Kohonen. 1998. Feature Mapping Through Graphics Hardware. In Proceedings of 3rd Int. Conference on Computational Intelligence and Neurosciences, 4 pages.

Bradski, G., & Grossberg, S. (1995). Fast-learning VIEWNET architectures for recognizing three-dimensional objects from multiple two-dimensional views. Neural Networks, 8 (7-8), 1053-1080. Brain-inspired computing. Invited keynote address, Bionetics 2010, Boston, MA, USA.

Canny, J.A. (1986). Computational Approach to Edge Detection, IEEE Trans. Pattern Analysis and Machine Intelligence, 8(6):679-698.

Carpenter, G.A. and Grossberg, S. (1987). A massively parallel architecture for a self-organizing neural pattern recognition machine. Computer Vision, Graphics, and Image Processing 37, 54-115.

Carpenter, G.A., and Grossberg, S. (1995). Adaptive resonance theory (ART). In M. Arbib (Ed.), The handbook of brain theory and neural networks. (pp. 79-82). Cambridge, M.A.: MIT press.

Carpenter, G.A., Grossberg, S. and Rosen, D.B. (1991). Fuzzy ART: Fast stable learning and categorization of analog patterns by an adaptive resonance system. Neural Networks 4, 759-771.

Carpenter, Gail A and Grossberg, Stephen. The art of adaptive pattern recognition by a self-organizing neural network. Computer, 21(3):77-88, 1988.

Coifman, R.R. and Maggioni, M. Diffusion wavelets. Applied and Computational Harmonic Analysis, 21(1):53-94, 2006.

Coifman, R.R., Lafon, S., Lee, A.B., Maggioni, M., Nadler, B., Warner, F., and Zucker, S.W. Geometric diffusions as a tool for harmonic analysis and structure definition of data: Diffusion maps. Proceedings of the National Academy of Sciences of the United States of America, 102(21):7426, 2005.

Davis, C. E. 2005. Graphic Processing Unit Computation of Neural Networks. Master's thesis, University of New Mexico, Albuquerque, NM, 121 pages.

Dosher, B.A., and Lu, Z.L. (2010). Mechanisms of perceptual attention in precuing of location. Vision Res., 40(10-12). 1269-1292.

Ellias, S. A., and Grossberg, S. 1975. Pattern formation, contrast control and oscillations in the short term memory of shunting on-center off-surround networks. Biol Cybern 20, pp. 69-98.

Extended European Search Report and Written Opinion dated Jun. 1, 2017 from European Application No. 14813864.7, 10 pages.

Extended European Search Report and Written Opinion dated Oct. 12, 2017 from European Application No. 14800348.6, 12 pages.

Extended European Search Report and Written Opinion dated Oct. 23, 2017 from European Application No. 15765396.5, 8 pages.

Fazl, A., Grossberg, S., and Mingolla, E. (2009). View-invariant object category learning, recognition, and search: How spatial and object attention are coordinated using surface-based attentional shrouds. Cognitive Psychology 58, 1-48.

Földiák, P. (1990). Forming sparse representations by local anti-Hebbian learning, Biological Cybernetics, vol. 64, pp. 165-170.

Friston K., Adams R., Perrinet L., & Breakspear M. (2012). Perceptions as hypotheses: saccades as experiments. Frontiers in Psychology, 3 (151), 1-20.

Galbraith, B.V, Guenther, F.H., and Versace, M. (2015) A neural network-based exploratory learning and motor planning system for co-robots.Frontiers in Neuroscience, in press.

George, D. and Hawkins, J. (2009). Towards a mathematical theory of cortical micro-circuits. PLoS Computational Biology 5(10), 1-26.

Georgii, J., and Westermann, R. 2005. Mass-spring systems on the GPU. Simulation Modelling Practice and Theory 13, pp. 693-702.

Gorchetchnikov A., Hasselmo M. E. (2005). A biophysical implementation of a bidirectional graph search algorithm to solve multiple goal navigation tasks. Connection Science, 17(1-2), pp. 145-166.

Gorchetchnikov A., Hasselmo M. E. (2005). A simple rule for spike-timing-dependent plasticity: local influence of AHP current. Neurocomputing, 65-66, pp. 885-890.

Gorchetchnikov A., Versace M., Hasselmo M. E. (2005). A Model of STDP Based on Spatially and Temporally Local Information: Derivation and Combination with Gated Decay. Neural Networks, 18, pp. 458-466.

Gorchetchnikov A., Versace M., Hasselmo M. E. (2005). Spatially and temporally local spike-timing-dependent plasticity rule. In: Proceedings of the International Joint Conference on Neural Networks, No. 1568 in IEEE CD-ROM Catalog No. 05CH37662C, pp. 390-396.

Gorchetchnikov, A. 2017. An Approach to a Biologically Realistic Simulation of Natural Memory. Master's thesis, Middle Tennessee State University, Murfreesboro, TN, 70 pages.

Grossberg, S. (1973). Contour enhancement, short-term memory, and constancies in reverberating neural networks. Studies in Applied Mathematics 52, 213-257.

Grossberg, S., and Huang, T.R. (2009). ARTSCENE: A neural system for natural scene classification. Journal of Vision, 9 (4), 6.1-19. doi:10.1167/9.4.6.

Grossberg, S., and Versace, M. (2008) Spikes, synchrony, and attentive learning by laminar thalamocortical circuits. Brain Research, 1218C, 278-312 [Authors listed alphabetically].

Hagen, T. R., Hjelmervik, J., Lie, K.-A., Natvig, J., and Ofstad Henriksen, M. 2005. Visual simulation of shallow-water waves. Simulation Modelling Practice and Theory 13, pp. 716-726.

Hasselt, Hado Van. Double q-learning. In Advances in Neural Information Processing Systems, pp. 2613-2621,2010.

Hinton, G. E., Osindero, S., and Teh, Y. (2006). A fast learning algorithm for deep belief nets. Neural Computation, 18, 1527-1554.

\* cited by examiner

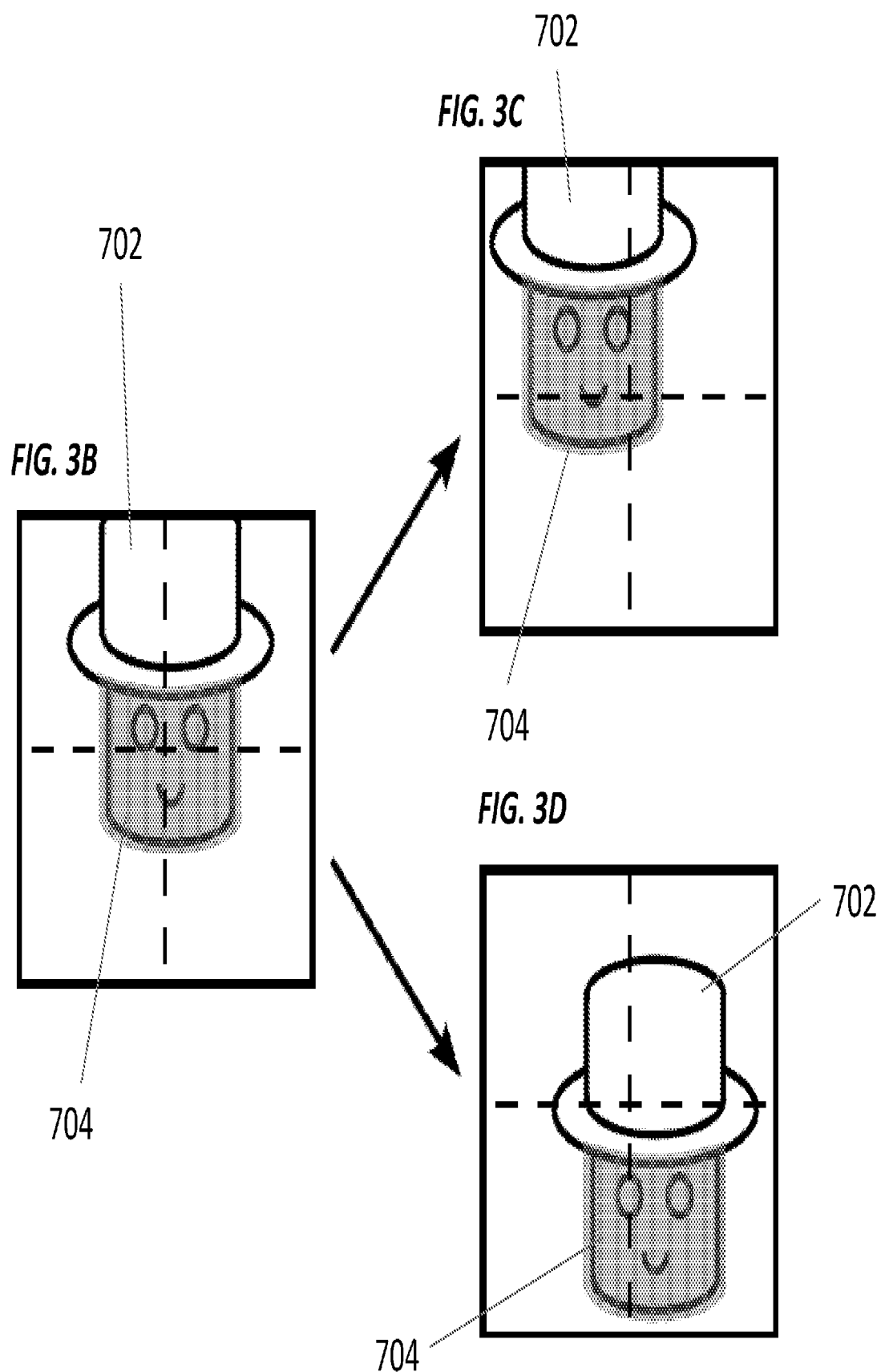

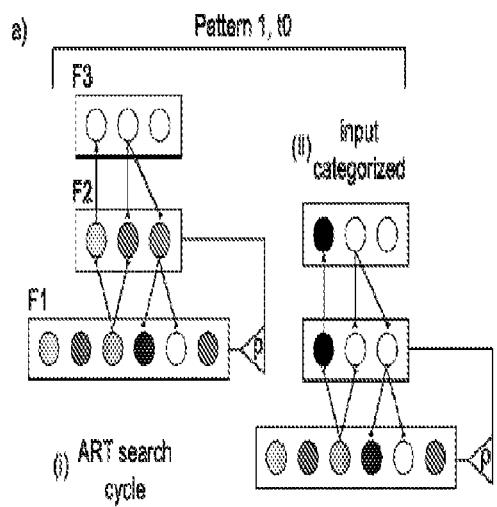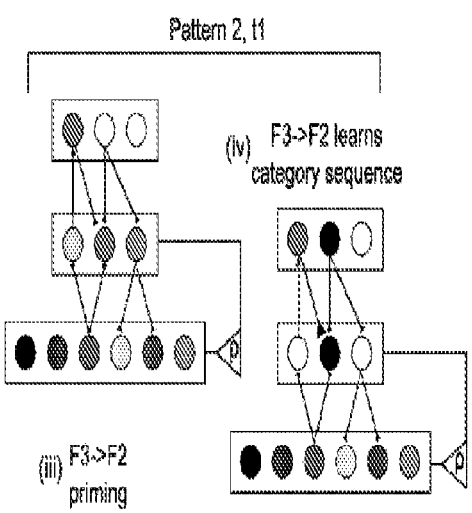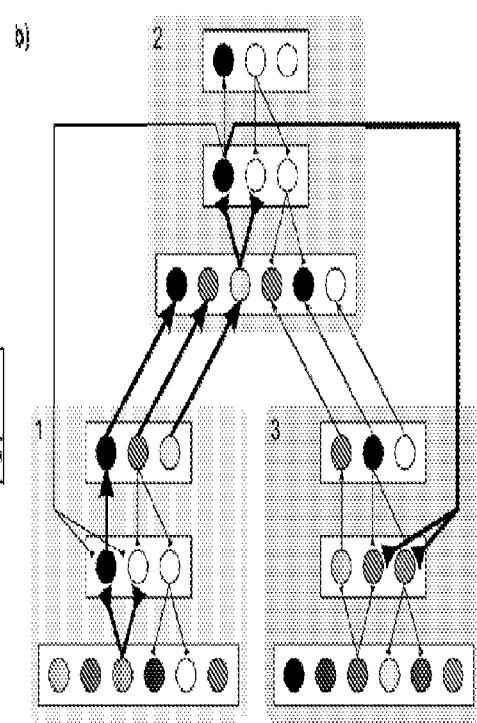
FIG. 5A                FIG. 5B

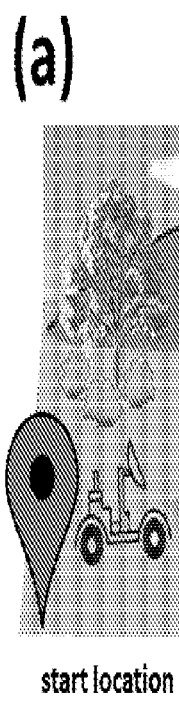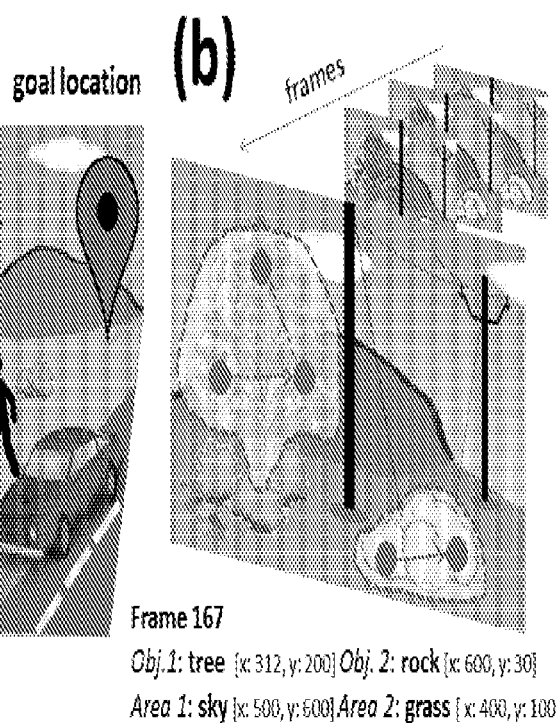
FIG. 18A
FIG. 18B

METHODS AND APPARATUS FOR AUTONOMOUS ROBOTIC CONTROL

CROSS-REFERENCE TO RELATED PATENT APPLICATION

This application is a continuation of U.S. application Ser. No. 15/262,637, filed Sep. 12, 2016, and "Methods and Apparatus for Autonomous Robotic Control," which is a bypass continuation of International Application No. PCT/US2015/021492, filed Mar. 19, 2015, and entitled "Methods and Apparatus for Autonomous Robotic Control," which in turn claims priority, under 35 U.S.C. § 119(e), from U.S. Application No. 61/955,755, filed Mar. 19, 2014, and entitled "Methods and Apparatus for Autonomous Robotic Control." Each of these applications is hereby incorporated herein by reference in its entirety.

GOVERNMENT SUPPORT

This invention was made with government support under Contract No. FA8750-12-C-0123 awarded by Air Force Research Laboratory (AFRL) and under Contract No. NNX12CG32P awarded by NASA Phase I STTR. The government has certain rights in the invention.

BACKGROUND

For a mobile robot to operate autonomously, it should be able to learn about, locate, and possibly avoid objects as it moves within its environment. For example, a ground mobile/air/underwater robot may acquire images of its environment, process them to identify and locate objects, then plot a path around the objects identified in the images. Additionally, such learned objects may be located in a map (e.g., a world-centric, or allocentric human-readable map) for further retrieval in the future, or to provide additional information of what is preset in the environment to the user. In some cases, a mobile robot may include multiple cameras, e.g., to acquire stereoscopic image data that can be used to estimate the range to certain items within its field of view. A mobile robot may also use other sensors, such as RADAR or LIDAR, to acquire additional data about its environment. RADAR is particularly useful for peering through smoke or haze, and lidar returns can sometimes be used determine the composition of objects within the environment.

A mobile robot may fuse LIDAR, RADAR, IR, ultrasound, and/or other data with visible image data in order to more accurately identify and locate obstacles in its environment. To date, however, sensory processing of visual, auditory, and other sensor information (e.g., LIDAR, RADAR) is conventionally based on "stovepiped," or isolated processing, with little interactions between modules. For this reason, continuous fusion and learning of pertinent information has been an issue. Additionally, learning has been treated mostly as an off-line method, which happens in a separate time frame with respect to performance of tasks by the robot.

As opposed to this, animals perform both learning and performance simultaneously, effortlessly segmenting sensory space is coherent packets to be fused in unique object representations. An example is a conversation between two people in a crowded party, where the signal-to-noise ratio (S/N) of the speaker voice is extremely low. Humans are able to focus visual attention to the speaker, enhance S/N, bind the pitch of the speaker to the appropriate person speaking, and learning the joint "object" (visual appearance and speaker identity) so that recognition of that person is possible with one modeality alone.

SUMMARY

Embodiments of the present invention include a system for automatically locating and identifying an object in an environment. In one example, the system comprises at least one sensor (e.g., an image sensor, RADAR, microphone, etc.), a spatial attention module (aka a Where system) operably coupled to the sensor, and a semantics module (aka a What module) operably coupled to the spatial attention module. In operation, the sensor acquires sensor data representing of at least a portion of the object. The spatial attention module produces a foveated representation of the object based on the sensor data, track a position of the object within the environment based on the foveated representation, and selects another portion of the environment to be sensed by the sensor based on the foveated representation of the object. And the semantics module determines an identity of the object based on the foveated representation of the object.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 3A-3D illustrate a process for identifying and locating objects in a robot's environment by fitting a spatial shroud to successive images of the robot's environment.

FIGS. 5A and 5B illustrate an implementation of the temporal Adaptive Resonance Theory (tART) model.

FIGS. 18A and 18B illustrate an example simulation of autonomous navigation with a coarse observer.

DETAILED DESCRIPTION

Figure 1:
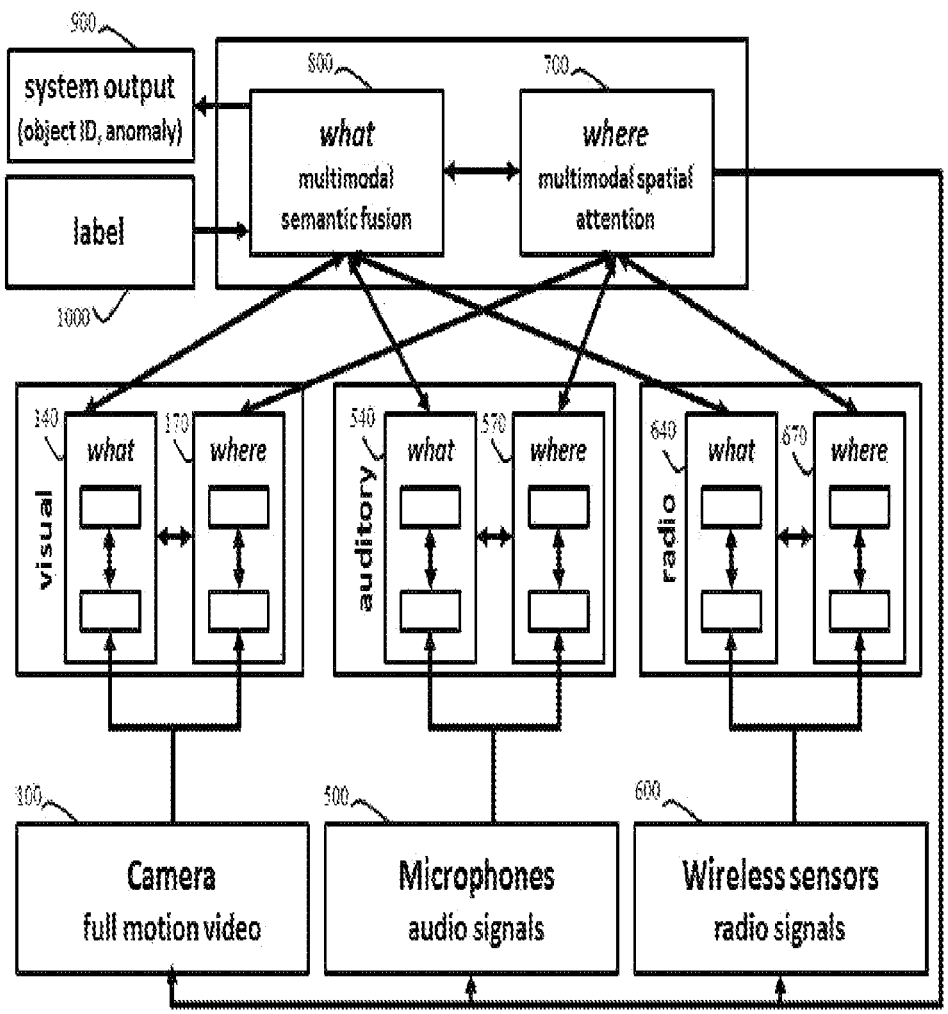
FIG. 1 shows an example OpenSense architecture, in this case illustrating three sensory modalities, but expandable to other sensor types and number.

The technology described herein provide a unified mechanism for identifying, learning, localizing, and tracking objects in an arbitrary sensory system, including data streams derived from static/pan-tilt cameras (e.g., red-green-blue (RGB) cameras, or other cameras), wireless sensors (e.g., Bluetooth), multi-array microphones, depth sensors, infrared (IR) sensors (e.g., IR laser projectors), monochrome or color CMOS sensors, and mobile robots with similar or other sensors packs (e.g., LIDAR, IR, RADAR), and virtual sensors in virtual environments (e.g., video games or simulated reality), or other networks of sensors. Additionally, the technology disclosed herein allows for stable learning of the identity of single sensor modality of multiple sensor modality objects in the above sensor data streams. Additionally, the technology disclosed herein enables fusion of disparate sensory information in a unified sensory object using spatial information (location of object in 3D space) to (a) enhance sensor information pertinent to the object and suppress sensor information that is not pertinent (S/N enhancement) and (b) learn joint representation of the object via online learning.

In one example, the the technology disclosed herein processes the input either as one or more continuous streams representing the environment or as static sensors snapshots of the environment. The technology applies a hierarchical neurally-inspired mathematical model that combines several learning systems in a reciprocally connected, feedforward/feedback (including recurrent) architecture. This learning technique allows networks of rate-based (neurons or nodes or population of nodes that are represented by continuous variables) or spike-based (neurons or nodes that are represented by continuous variables and that communicate by spikes, or sparse binary events) neural models organized in adaptive (learning) stackable modules to learn, in real time, novel patterns. These techniques do not require batch learning, yet allow fast, incremental, online learning as exhibited in fast learning models.

The technology presented herein addresses major limitations in current approaches, including but not limited to: (1) the inability to segregate discrete objects of interest to be learned in the data stream from their "background"; (2) the need to design separate sub-systems for object segregation, object recognition, and object tracking; (3) the inability of a system to maintain temporal continuity (identity, position) of objects in the environment taking into account motion of the object and observer; and (4) the need to separate system learning and system use (or deployment, or performance) in two distinct stages to prevent overriding prior learning of object in the data stream.

Neurally Inspired Robot Perception, Object Identification, and Object Location

A conventional robot does not perceive its environment like a human. For example, a robot may "see" its environment by acquiring imagery of some or all or its environment at a uniform resolution. It then processes the imagery by dividing the imagery into a grid of pixels and examining each pixel in the grid. This process can take too much time and too much energy to be useful for identifying objects moving relative to the robot, especially if the robot is moving at relatively high velocity (e.g., a drone flying at low altitude). In addition, the robot may spend an inordinate amount of time processing empty or irrelevant pixels.

A human does not process the detail of entire images on a pixel-by-pixel basis. Instead, the human eye acquires imagery of non-uniform resolution: the central part of the retina, or fovea, which is densely packed with light-sensitive cones, acquires the central part of each image at relatively fine resolution. And the peripheral portion of the retina, which is covered at lower density with light-senstive rods and cones, acquires the peripheral portion of each image at coarser resolution. The resulting "foveated imagery" has resolution that varies spatially across each image, with the finest resolution at a fixation point and coarser resolution elsewhere. This notion of obtaining imagery at a resolution that varies spatially across each image is referred to herein as "foveation."

To account for the spatial variation in image resolution, a human moves his or her eyes rapidly among different points in his or her field of view. For instance, a human may fixate on points at or near an interesting portion of a scene, such as a face, for relatively long periods, and fixate on points at or near less interesting portions of the scene, such as a tree, for shorter periods, if at all. These quick, simultaneous movements to different fixation points, or saccades, allow a human to identify and locate items of interest without spending time or energy examining interesting portions of the scene.

Similarly, the OpenSense technology disclosed herein allows a robot to identify and locate objects in its environment using "foveated" data collection and "saccade" style allocation of sensor resources as explained below with respect to FIGS. 1-4. For instance, in a visual implementation of OpenSense, called "OpenEye," one or more processors may control collection and processing of visual imagery according to a neural model inspired by the human brain. A camera or other sensor acquires imagery of the robot's environment and passes this imagery to a graphics processing unit (GPU) or other suitable processor, which locates and identifies one or more objects in the imagery (e.g., using the What and Where pathways described in greater detail below) based on the imagery itself and information about the sensor's orientation, position, and/or field of view. In some cases, the GPU may translate the imagery among different frames of reference, including camera-centered, robot-based egocentric, and allocentric frames of reference, to make processing more efficient and/or more precise.

The processor also determines the next fixation point of the sensor system based on the location and/or identity of the object(s). In some cases, it transmits movement vector representing the saccade between the current fixation point and the next fixation point to an actuator that then actuates the sensor appropriately. For instance, the processor may cause a pan-tilt actuator to move a camera mounted on the robot so as to acquire imagery of an object from different angles and/or positions. The robot itself may move to change the sensor's field of view. In other cases, the processor may cause synthetic "saccades," e.g., by processing different portions of the same image or different portions of different images at different resolutions depending on the objects and their locations. The robot may also use object information and sensor position and orientation data to inhibit the sensor from fixating repeatedly on the same object or the same portion of the scene.

Just like human perception, robotic perception in the OpenSense framework can extend to sources of sensory information besides visible imagery. For instance, the OpenSense framework can be applied to range data acquired by RADAR, LIDAR, and SONAR. It can also be applied to passive electromagnetic sensing, including audio sensing. Moreover, the GPUs and/or other processors can allocate sensor resources dynamically in a manner similar to the foveation and saccading discussed above with respect to visual imagery, e.g., by causing a nodding LIDAR to change its sweep arc or rate, by processing audio data at different spectral resolutions in different bands or detecting sound waves emanating from a particular location, by orienting the receptivity pattern of a radio-frequency in particular direction, etc.

And like a human brain, the neural-network can fuse data from multiple sources in order to more efficiently identify and locate objects in a robot's environment as explained below with respect to FIG. 1. For example, a robot may use an image sensor to take a picture of an object, then identify and locate the object from the picture using a vision-oriented What/Where system. The vision-oriented What/Where system sends an output representing the object's identity and/or location (e.g., "focus at x=12, y=32, z=31") to a joint What/Where system that also controls an audio-oriented What/Where system and a RADAR-oriented What/Where system. In some cases, the vision-oriented What/Where system's output may be in a frame of reference defined with respect to the robot (an egocentric reference frame) or defined with respect to other objects in the environment (an allocentric reference frame).

The joint Where system tells one or more of the other sensory modules in the OpenSense framework (auditory, RADAR, etc): "all focus at x=12, y=32, z=31." The auditory system responds to this command by suppressing anything in the auditory data stream that is not in x=12, y=32, z=31, e.g., by using Interaural Time Differences (ITD) to pick up signals from one location, and suppress signals from other locations. Similarly, the RADAR system may focus only on data acquired from sources at or near x=12, y=32, z=31, e.g., by processing returns from one or more appropriate azimuths, elevations, and/or range bins.

Each lower-level Where system may generate its own estimate of the object's location and pass this estimate to its corresponding What system and to the joint Where system. Similarly, each lower-level What system may generate its own object identification based on the corresponding object location estimate and pass this information to the joint What/Where system. The robot's joint What/Where fuses and processes this information to identify and locate the object, possibly with a higher degree of confidence than any of the lower level What/Where systems. For instance, the joint Where system may select a unique spatial location in 3D space, then bias the What system module to fuse the identity of separate sensory streams into a coherent object-centered representation.

Because the technology disclosed herein mimics human neural processing, it can process imagery and other sensory data more efficiently and identify objects in the robot's environment more quickly. This is especially useful for robots in hazardous applications, such as planetary exploration, where processing and battery efficiency are critical, and for robots that collect large volumes of data, such surveillance drones, where efficient sensemaking is key to interpreting large amounts of real-time data. It also has general application to all types of vision systems, including simulations, such as those used in video games, flight simulators, etc.

The OpenSense System

FIG. 1 illustrates an embodiment of the technology disclosed herein, called OpenSense, which allows real-time sensing and cognitive reasoning on heterogeneous sensor streams. OpenSense can autonomously fuse multiple sensory inputs into a multisensory scene, segregate this multisensory scene into objects that correspond to distinct physical sources, dynamically allocate sensor resources for fast and automatic enhancement of high-priority targets and noise suppression, and detect when anomalous changes occur to known objects based on changes in low-level sensor signature.

FIG. 1 shows that OpenSense includes several What-Where systems (described in greater detail below). FIG. 1 shows how these What-Where systems can be combined together in a higher-order sensory processing system (OpenSense) that can fuse data from many sensors into a coherent object, and continuously learn about the coherent object while tracking it. This higher-order sensory processing system goes beyond other systems as it combines online learning, focus of attention (namely, learning only what belongs to objects, and fuse the corresponding data, rather than fuse all which comes to the sensors irrespective of what in the environment generates the signal), and tracking in one single solution.

Although FIG. 1 illustrates OpenSense system with three sensory inputs, the OpenSense system can be generalized to arbitrary numbers and types of sensory inputs (e.g., static/pan-tilt cameras, wireless sensors, multi-array microphone, depth sensors, IR laser projectors, monochrome CMOS sensors, and mobile robots with similar or other sensors packs—e.g., LIDAR, IR, RADAR, and virtual sensors in virtual environments—e.g., video games or simulated reality—or other networks of sensors).

In the example shown in FIG. 1, camera inputs (100), audio signals (500), and radio signals (600) are collected from a camera, microphones, and radio sensors (e.g., Bluetooth), respectively. Visual, auditory, and radio information is processed by three modules based on the same basic architecture, each including mutual interactions between respective semantic components, also called What components (semantic, 140, 540, and 640), and respective spatial attention components, also called Where components (spatial attention, 170, 570, and 670). Individual Where pathways converge in a high-level Where stage (700) and compete to grab "attentional focus" among sensory systems. This high-level Where stage (700) allows a high-level What system (800) to fuse pertinent multi-sensory information, e.g., creating an objects category that maps spatially-defined visual, auditory, and radio signals in a unique object. The high-level What system (800) also projects back to each sensor raw data stages (bi-directional connections) to match object expectation with low-level data and generate anomaly alerts. The high-level Where system (700) narrows the sensors' "fields of view" to collect information about the object in the current focus of attention until the high-level What system (800) has gained enough data for learning or classification. The system automatically generates scene metadata associated with each video frame summarizing object identity and anomalies (900). Finally, analysts can provide human-readable labels (1000) for the multi-sensory object.

An implementation of this technology for the visual domain is named OpenEye and uses physical or virtual pan-tilt or static cameras to collect data. OpenEye can be implemented as an artificial, active sensory system that addresses limitations set forth above in a unified framework. OpenEye may be used in both artificial environments (e.g., synthetically generated environments via video-game engine) and natural environments. OpenEye learns incrementally about its visual input, and identifies and categorizes object identities and object positions. OpenEye can operate with or without supervision—it does not require a manual labeling of object(s) of interest to learn object identity. OpenEye can accept user input to verbally label objects. OpenEye simulates a mammalian brain's dorsal (where controlling where to look) and ventral (what—controlling the content of the image) pathways by using simulated eye movements (in virtual or real cameras) to learn identity of objects in complex images.

In some implementations OpenEye uses a space-variant, log-polar representation of the input visual field to sample the image "view" generated by each eye movement. The log-polar representation provides some invariance to translation/rotation. The log-polar representation can also provide substantial savings in processing time with better scalability to large datasets by employing non-uniform input sampling and rapid scan of image segments, as opposed to processing of the whole image at equal resolution.

OpenEye uses the what-to-where feedback to sample the image intelligently. OpenEye does so by using knowledge of the identity of the current object and its context to focus on spatial locations that yield greatest disambiguation of competing object identity (e.g., areas of an image that are more unique to an object). OpenEye may be validated on natural and synthetic images, as well as on the standard datasets (one example is the Mixed National Institute of Standards and Technology (MNIST) handwritten digit dataset).

As opposed to other approaches (e.g., neural networks), the OpenSense method, and the specific OpenEye implementation, may not need to rely on extensive training (batch training) to be able to classify correctly objects in the data stream. OpenEye can learn new knowledge online (e.g., during performance) without corrupting or forgetting previously learned knowledge and without needing to retrain the system on the whole knowledge database (batch learning). Additionally, the system is able to autonomously search for information in an image via an active visual search process, which mimics the mechanism used by mammals to rapidly and efficiently scan their visual world for information to confirm or disprove the current hypothesis about the object class. The OpenEye memory system allows on-line changes of synaptic weights, which represent the memory (knowledge) of the system. Additionally, OpenEye can mimic human eye movements by reproducing human fixation patterns with or without a training session where OpenEye learns the fixation location of a human user via eye-tracker.

Visual Stream Exploration and Visual Object Learning

The OpenEye model proposes a method for combining visual stream exploration and visual object learning. Each is considered separately below.

Visual Stream Exploration Models

The computational model proposed by Itti and Koch (2001) simulates aspects of human vision which predict the probability that a particular image area will attract an observer's attention and eye movements. The Itti and Koch model includes only bottom-up, or sensory features, whereas OpenEye also accounts for cognitive (top-down) biases on eye movements. Additionally, the Itti and Koch model does not include learning, object, or scene recognition, which are instead incorporated in OpenEye, where they bias image stream exploration as discussed below.

OpenEye also differs from the Riesenhuber and Poggio (1999) neural model, which employs a spatially homogenous representation of the image. In contrast, OpenEye uses both a spatially variant representation of the image and sensor movement. Both the Itti & Koch (2001) and Riesenhuber & Poggio (1999) models postulate that visual objects need to be identified in one glance. OpenEye, instead, accounts for the potential need to explore the input sensory image to gather additional evidence for recognition, which is particularly useful for ambiguous objects/scenes (e.g., occluded objects).

Visual Object Learning Models

In terms of learning, OpenEye may use two interchangeable learning methodologies. The first method, described in detail below, is based on the Baraldi and Alpaydin (1998, 2002) and Baraldi and Parmiggiani (1997) learning models, which provide the following benefits. The second method is based on a recurrent adaptive architecture described herein. Both methodologies simultaneously implement fast and slow learning.

Usually, fast learning (e.g., Carpenter and Grossberg, 1987) systems underperform slow-learning ones (Rumelhart et al., 1986), but the former are much more useful in engineered system such as robots or sensors operating in real-time in a rapidly changing environment. After only single instance of presentation of each item, humans and other animals can learn to recognize pictures, words, names, and faces, and recording at a local cellular level confirms that neurons can change to reflect such fast learning (Bunzeck & Düzel, 2006; Rutishauser et al., 2006). To date, no artificial system has been engineered to achieve this goal in a machine.

Several object recognition algorithms have been developed over the last few decades (for reviews, see Besl and Jain, 1985; Logothetis and Sheinberg, 1996; Riesenhuber and Poggio, 2000; Bengio et al., 2012). In general, a commonality between these algorithms is the focus on finding the appropriate representation for the data, where the difference among algorithms performance is due to the nature of the features/input data transformations. For instance, convolutional network models (Ranzato et al., 2007; Jarrett et al. 2009; LeCun et al., 2010) and restricted Boltzmann machines (Smolensky, 1986; Salakhutdinov and Hinton, 2009) are among the best object recognition algorithms. Both classes of algorithms perform three main steps: (1) feature extraction, which can be either hardwired, random, or learned; (2) non-linear transformation on the resulting filtered data; and (3) a pooling step on the result of step (2). The connectivity between stages and the number of filter-transform-pool stages can vary.

Deep learning networks include networks where there are several layers of stacked filter-transform-pool, e.g., in the HMAX model (Riesenhuber & Poggio, 1999) and deep belief networks (Hinton et al., 2006).

Similarly, Spratling (2008, 2009, 2012) has introduced several recognition systems built of stackable "cortical" modules. These models are composed of modules that work hierarchically and perform a process called "predictive coding", that looks very akin to matching in an ART system. A close examination of the derivation of the learning laws in these systems (Spratling et al., 2009) reveals that they were developed as an incremental version of a well-known batch coding algorithm, non-negative matrix factorization (NMF), developed by Lee and Seung (1997, 1999). The algorithm presented by Spratling at al. does allow incremental (fast) learning, but does not include methods for object segregation/segmentation, scene recognition, and active vision.

However, none of the above-mentioned object recognition algorithms deals with the issues of how objects are separated from their background, and neither of those models uses space-variant sampling.

The ARTScan (Fazl et al., 2009) Model, the Saccading Restricted Boltzmann Machine (sRBM) (Larochelle & Hinton, 2012), and the Entropy Minimization Algorithm of Saccades (Friston et al., 2012)

The saccading restricted Boltzmann machine (Larochelle and Hinton, 2012) uses space variant vision. However, it does not include a mechanism that informs the system when the system stops fixation from an object and starts fixating on another, which is provided by a human supervisor. The system could not tell apart two identical objects presented side-by-side with a spatial gap separating them.

The entropy minimization algorithm of saccades (Friston et al., 2012) includes bi-directional What-to-Where stream interactions but does not use space-variant vision, and suffers from the same issue as Larochelle and Hinton (2012) in terms of object fixation memory.

The ARTScan (Fazl et al., 2009) model includes Where-to-What interaction in guiding when the What system should learn/stop learning, but does not include What-to-Where interactions to inform eye movement and visual search. Additionally, OpenEye differs from ARTScan in these additional dimensions:

OpenEye and ARTScan use a different log-polar sampling;
OpenEye shroud formation is feed-forward;
OpenEye is designed to operate in 3D environment in a noisy background;
OpenEye is designed to handle self-motion;
OpenEye employs a concept of temporal continuity to support dynamic scenes;
OpenEye can combine multiple saliencies, endogenous spatial attention, attention to specific features in order to make next saccade; and
OpenEye was tested standard MNIST database, whereas ARTScan was tested on handcrafted images.

Object learning models from Baloch and Waxman (1991), Bradski and Grossberg, (1995), Seibert and Waxman (1992) do use space-variant transformation, or "cortical magnification", but only focus statically at an object's center-of-mass.

OpenEye methods discussed below employ a learning scheme that maximizes memory efficiency in terms of learning accuracy and capacity to enable both fast and slow stable learning of sensory features.

Benefits and Applications

Benefits of these methods and systems disclosed herein include providing a single process for identifying, learning, localizing, and tracking objects in an arbitrary sensory system (e.g., data streams derived from static/pan-tilt cameras, cameras, LIDAR, IR, RADAR, microphones arrays, or other networks of sensors, including sensors on one or more mobile robots) and for learning the identity of different sensory scenes. Exemplary embodiments allow quick and stable learning of new patterns without the need to retrain the system, while reducing network (system) size and communication between system components with respect to competing models. The technology disclosed herein is useful to allow continuous learning of arbitrary sensory representations in hierarchies of rate-based or spike-based neural processing stages connected by adaptive (learnable) synaptic weights. This technology disclosed herein is general enough to be applicable to any sensory system, and the learning techniques can be applied to two or multiple-stages network, where a neural stage can be a sensory stage and another neural stage can be a higher-order (e.g., categorization) stage. Additionally, the techniquescan be applied to higher-order processing stages, e.g., in higher-order processing stages where representations are more abstract than the one pertaining neural stages at the sensor stage. Additionally, a benefit of this technology is to allow fast learning of new stimuli without the need to interrupt the functioning of the machine. This allows a robot, a camera, a microphone, or another sensor (e.g., LIDAR, RADAR, IR sensor) to quickly learn the identity of a new, previously unlearned input without the need to retrain previously seen input.

The technology presented herein has applications in designing software to either extract information or control mobile robots, cameras, microphones, motorized vehicles (e.g., self-driving cars) or other networks of sensors. In particular, the technology disclosed herein allows these machines to increase their knowledge base (e.g., the number of visual, acoustic, or other sensors objet it can recognize) over time without the need to retrain the system on the entire knowledge base.

OpenEye Overview

In its first instantiation of OpenSense as a visual system operating on visual data, the OpenEye model is comprised of four main modules: the Environment Module, the Where system, the What system, and an external module that can provide a teaching signal to the what system. These four components are discussed in detail below and shown in FIGS. 1-4.

The Environment Module (e.g., camera 100, microphones 500, and/or wireless sensors 600) abstracts interactions between the vision system and the environment, which can be a virtual environment or a real environment sampled by a fix/pan-tilt camera, a robot-mounted camera, or other visual or non-visual sensory system. This module delivers a visual image to the visual system and executes camera movement commands, which emulate human eye movements. The environment module allows OpenEye to interact with the environment: virtual or real, static or dynamic, real time or prerecorded.

One task of the Where System (130) is to decide where the sensory system should "look" based on salient image properties extracted from the visual image, or based on information coming from the What System pertaining to the identity of objects in the environments, and/or the scene identity as a whole. Processing of visual image by the where system module includes aspects of the mammalian lateral geniculate nucleus (LGN), primary visual cortex (V1), and higher cortices (V2, MT, MST) processing. The image obtained from the environment module in retinal coordinates, undergoes log-polar transformation to simulate space-variant sampling of the visual input and extraction of features such as (but not limited to) edge, contour, color, and luminance. OpenEye's functioning is not limited to log-polar sampling, and can operate with other space-variant transformations, such as the reciprocal-wedge transform (Tong and Li, 1995), or the pyramid method (Adelson et al., 1984), as examples.

Also known as the dorsal stream in vision literature (Mishkin and Ungerleider 1982; Webster et al., 1994), OpenEye's Where System generates camera movements in order to sample an image by foveation on the spatial location it selects as the most salient, where saliency can be determined by sensory input or semantic (What System) information. Foveation is achieved by centering the sensor in the object of interest, so that the object is likely to fall in the center of the space-variant representation. A form-fitting attentional shroud (namely a signal that fits the form, or shape, of an object, similarly to the way a shroud or veil fits the surface it rests on) is then formed around the foveated object. The shroud serves to suppress surrounding objects in order to isolate the object of interest for learning in the What System, and enables the system to trigger further camera movements centered exclusively on this enshrouded object. The ability of the Where System to form this attentional shroud around a single object has the added benefit of detecting when a foveation has left the previous object of interest. This change in foveated object produces a reset signal that represents temporal discontinuity between the foveations and is used by the What System to regulate learning, with the result of allowing OpenEye to group multiple views of an object (but not other objects, or the background) into coherent object categories. Another function of the Where System is to maintain a visual working memory of previously foveated locations such that the camera does not persistently choose the same point of fixation. Together with the Environment Module, the Where System forms the Where Pathway (140) that concerns with spatial interaction with the environment and spatial processing.

The What System (150) includes a hierarchy of classifiers that collectively learn to visually recognize an arbitrary number of objects regardless of each object's position and orientation relative to the sensor(s), e.g., a camera. The What System receives an object's feature representation as input from the Where System. Views are then clustered in an incremental, unsupervised fashion into object representations based either on their similarity or according to their temporal continuity as signaled by the Where System. The Where System provides a shroud-based reset signal, discussed later, that informs the What System when seemingly different views are part of the same or different object; this signal is important to OpenEye's ability to learn pose-invariant object representations (Fazl et al., 2009). An optional external Teacher (160) provides a supervised learning environment that not only improves classification accuracy and learning speed but also dynamically creates a user-friendly search interface to the visual system's learned knowledge. Because of the hierarchical separation of unsupervised view learning and supervised object-label learning, the What System can be switched between unsupervised and supervised learning modes at any time.

The What system and Teacher together form the What Pathway (170), modeled upon the ventral visual processing stream in the mammalian brain, which concerns the identity of those objects viewed by OpenEye.

Encoding OpenEye Activity

One task for OpenEye operation is switching between the coordinate systems centered on the on the robot/camera/sensor (ego-centric), the environment (image-centric or world-centric), and between metrics systems (Cartesian or log-polar). For example, the image can be sampled using a retinal metric (e.g., log-polar) or other metric (e.g., pyramid or reciprocal-wedge), but the signal for the cameral to move and how much to adjust the pitch and/or yaw is provided in a Cartesian metric (linear). One role of the Where System concerns translating between representations of a signal to different coordinate bases.

For clarity, the coordinate systems is defined with a term that refers to where the system is centered followed by a term that defines the distance metric of the reference frame. Reference frames can be centered at three possible locations: 1) sensor-centered, 2) ego-centered, and 3) image-centered. Sensor-centered refers to a coordinate system where the (0, 0) location resides at the position of the current camera center. Ego-centered refers to a coordinate system where (0, 0) corresponds to a neutral position of a sensor, with respect which the camera center may be shifted or rotated. Image-centered refers to a reference frame in which the (0, 0) location is at the image center. Image-centered can also be interpreted as global coordinates or scene-centered when the scene is dynamically changing.

Correspondingly there are three set of dimensions used in OpenEye: Image Dimensions [$W_i$ $H_i$], Sensor Movement Range [$W_e H_e$], and Sensor Dimensions [$W_s$ $H_s$] that represent log-polar transform of the Sensor Movement Range. This notation is used in OpenEye description below.

There are two distance metrics in the coordinate frames: 1) log-polar, and 2) Cartesian. The log-polar distance metric reflects how the eye naturally samples the image and image representation in primary visual cortex, and is employed in the described system by performing a space-variant (log-polar in this case, but other methods could be used) transformation to the ray input, while the Cartesian distance metric is more pertinent when mapping representations onto the real word or for invoking linear control of the eye/camera. In the figures and text below, coordinate frame are referred to as a combination of where it is centered and what defines its distance.

Figure 2A:
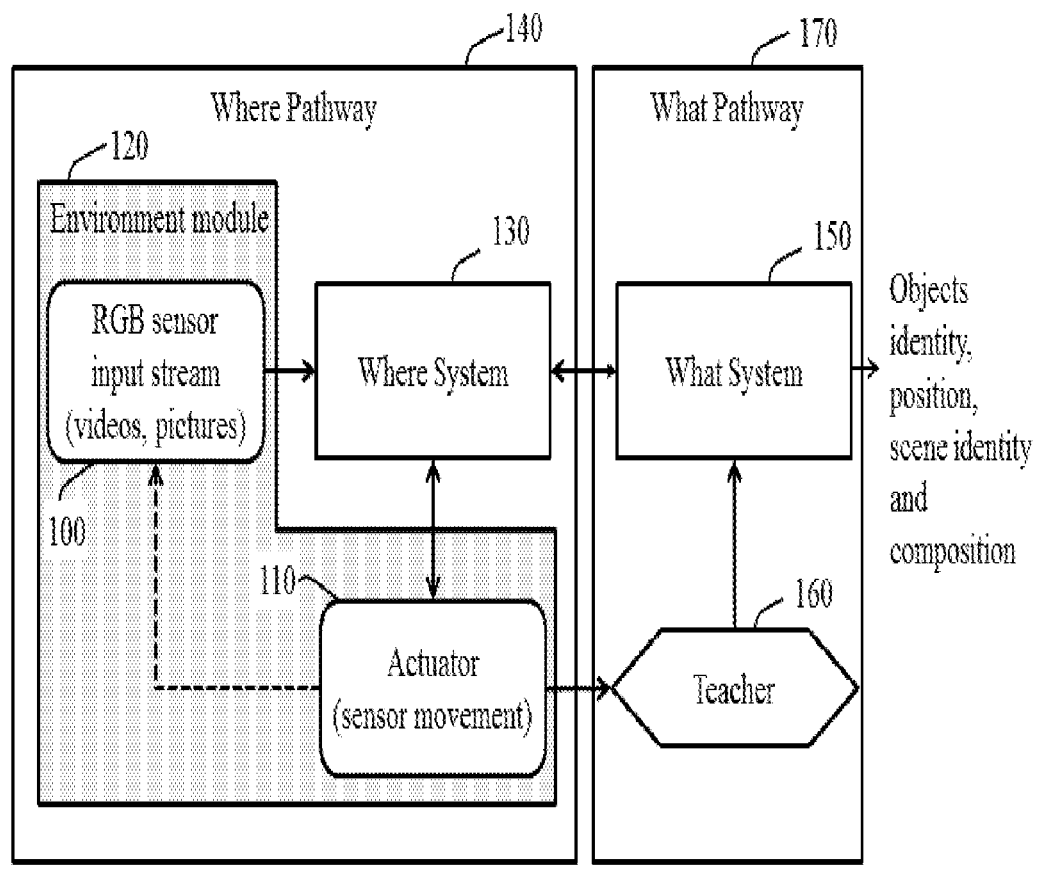
FIG. 2A is a block diagram of an example OpenEye system.
Figure 2B:
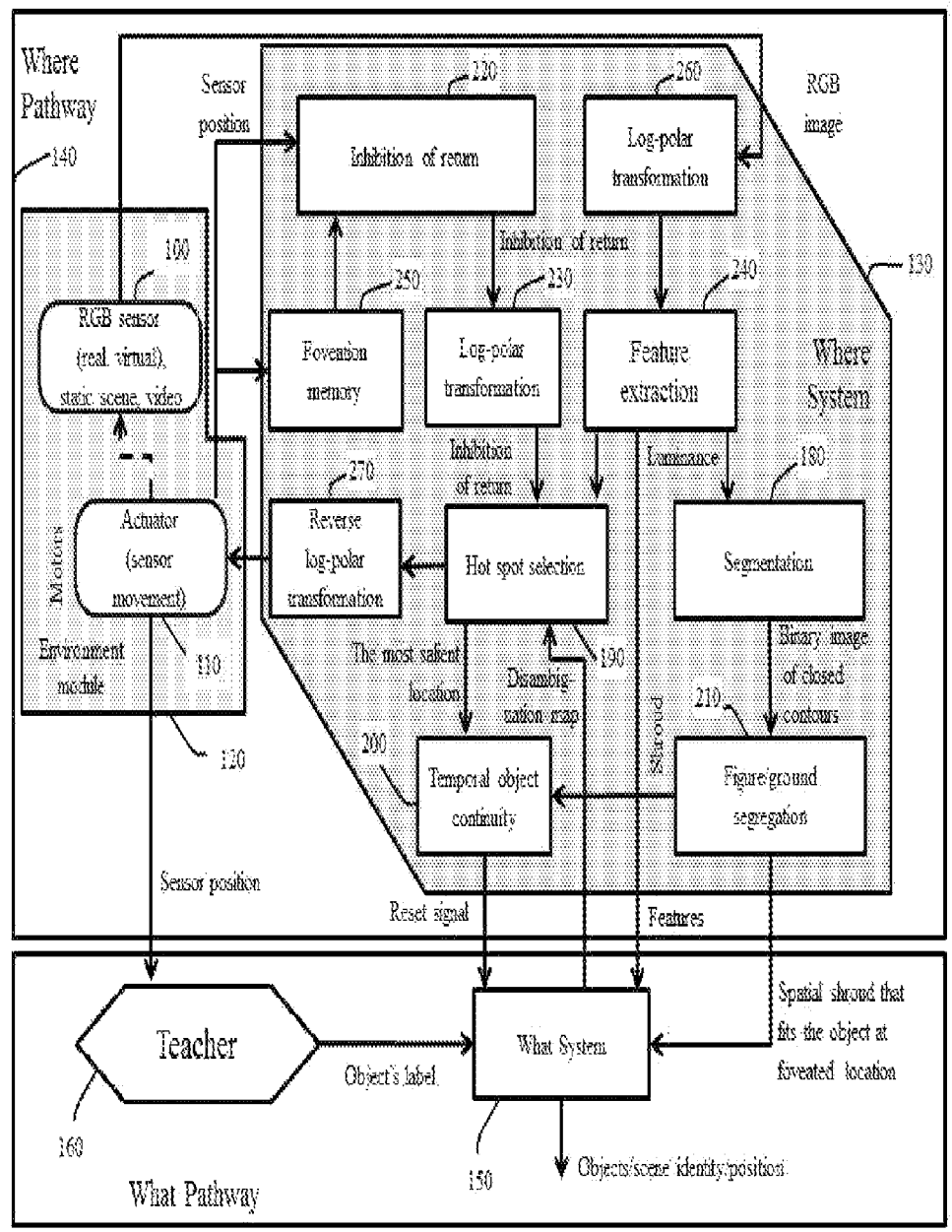
FIG. 2B is a block diagram of the Where Pathway module shown in FIG. 2A.
Figure 2C:
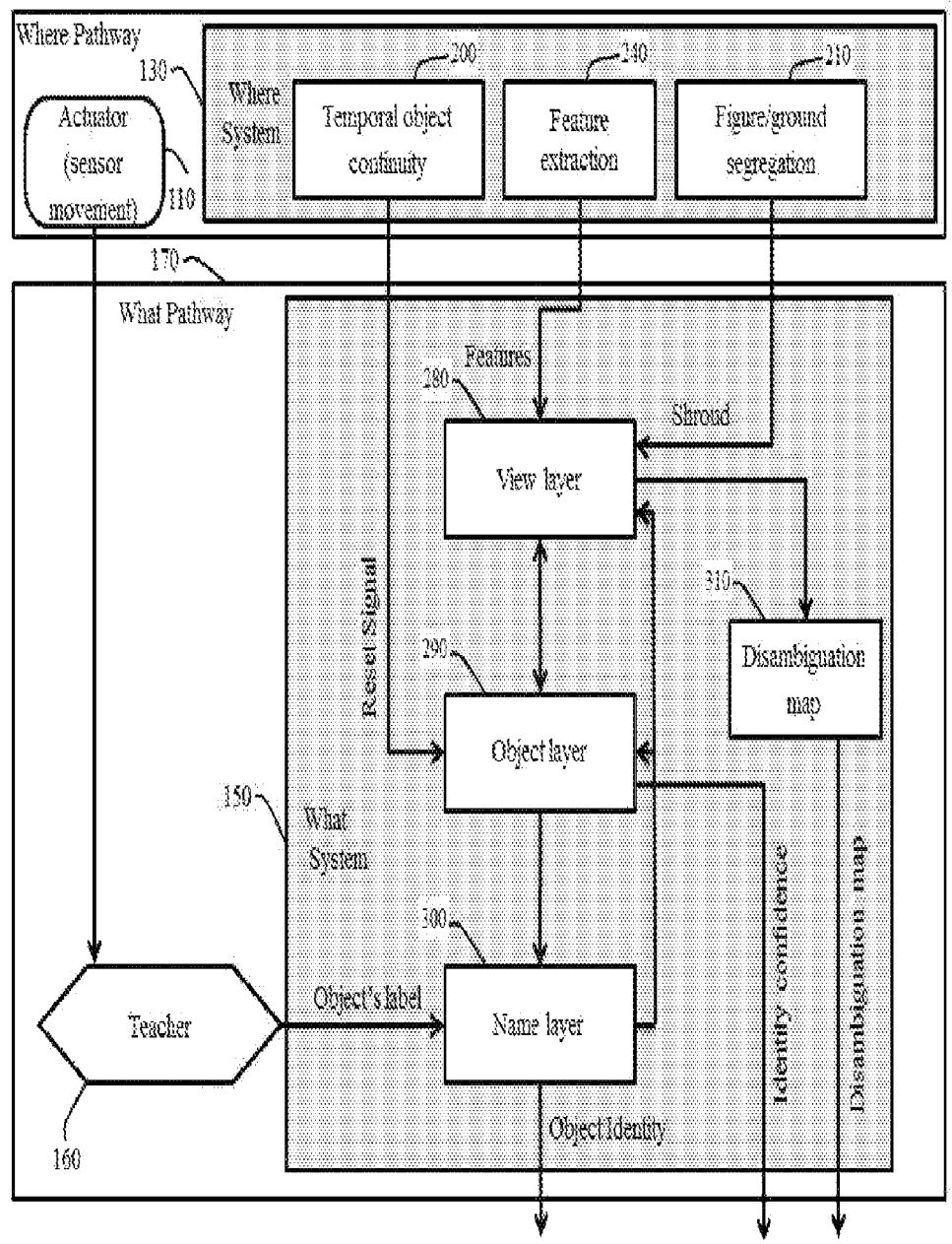
FIG. 2C is a block diagram of the What Pathway module shown in FIG. 2B.
Figure 3A:
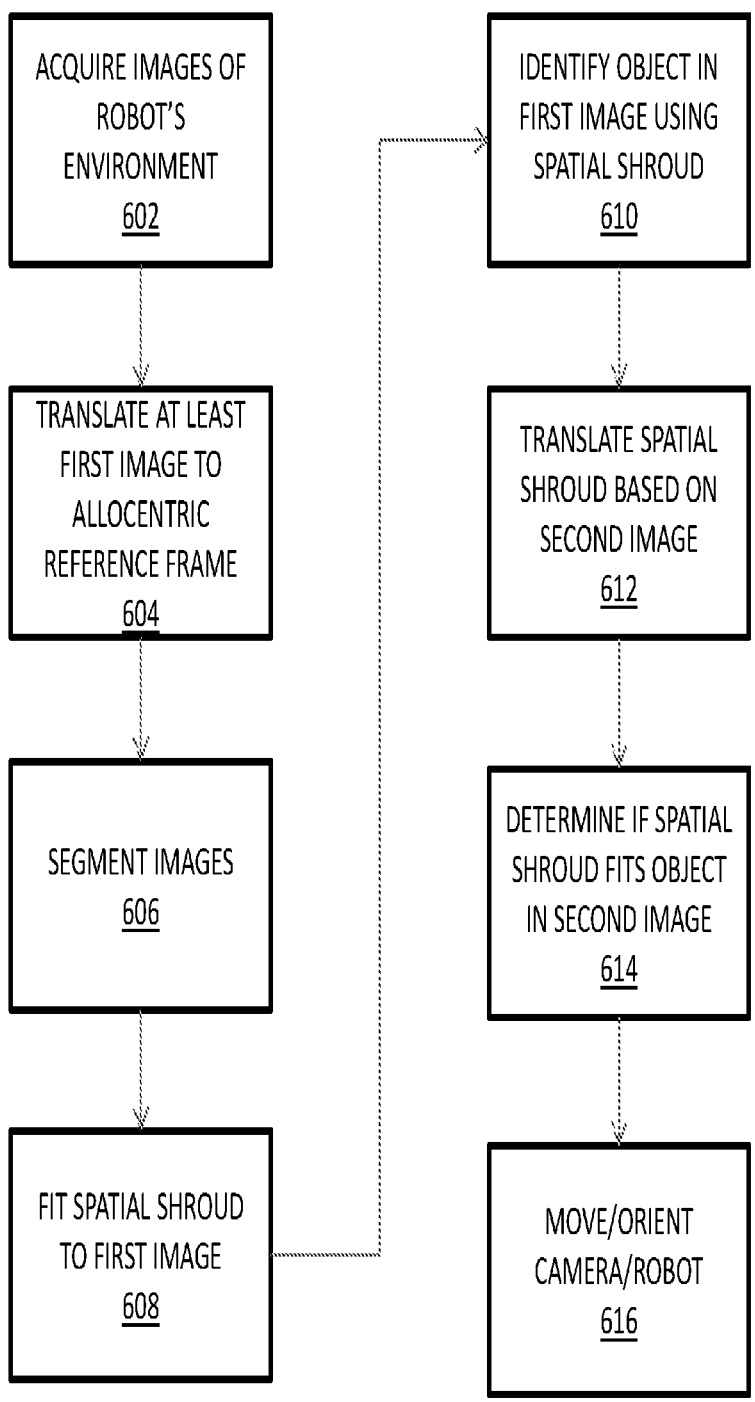

FIGS. 2A-2C depicts aspects of the What and Where systems shown in FIG. 1 for an OpenSense architecture that processes visual data (aka an OpenEye system). FIG. 2A shows the Environment Module (120) and the Where System (130), which collectively constitute the Where Pathway (140). The environment module 120 includes an RGB image sensor 100, which may acquire still and/or video images, whose field of view can be shifted, narrowed, and/or expanded with one or more actuators 110, including but not limited to zoom lenses, tip/tilt stages, translation stages, etc. The environment module 120 provides both image data from the image sensor 100 and actuation data (sensor position data) from the actuator(s) 110 to the Where system 130, which in turn provides processed image data to the What system 150. The environment module 120 also provides actuation data (sensor position data) from the actuator(s) 110 to the Teacher 160, which forms part of the What pathway 170 with the What system 150.

FIG. 2B shows the Where system 130 in greater detail. A first log-polar transformation block 260 in the Where system 130 performs a log-polar transformation on the image data from the image sensor 100 as described in greater detail below. A feature extraction block 240 identifies features in the transformed image data, which is segmented into bounded regions by a segmentation block 180. A figure/segragation block 210 segregates the bounded regions to form a spatial shroud that fits the foveated region of the image. The figure/segregation block 210 provides a representation of this spatial shroud to the What system 150.

FIG. 2B also shows that the actuator(s) 100 provide sensor position data to a foveation memory 250 and an inhibition of return block 220, which together prevent the image sensor from foveating the same portions of the scene (acquiring and/or processing imagery of the same portions of the scene, e.g., at enhanced resolution) unnecessarily. A second log-polar transformation block 230 performs a log-polar transformation on the output of the inhibition of return block and passes the transformed output to a hot spot selection block 190, which determines the next portion of the scene for foveation. A reverse log-polar transformation block 270 transforms the output vector into the frame of reference used by the actuator(s) 100 and provides the transformed output vector to the actuator(s) 100 for actuation of the sensor 100. A temporal object continuity block 200 processes another copy of the hot spot selection block output to determine if the next foveation location falls off the current object surface. If so, the temporal object continuity block 200 transmits a "reset" signal to the What system 150

FIG. 2C shows the What system 150 in greater detail. The What system 150 uses data from the temporal object continuity block 200, the feature extraction block 240, and the figure/ground segregation block 210 to identify and locate objects in the scene imaged by the image sensor 100. A view layer 280 uses features and shroud data from the Where system 130 to cluster shroud-gated visual representations of object views according to their feature similarity. A disambiguation map block 310 generates a disambiguation map of the scene based on these representations from the view layer 280.

The object layer 290 uses the representations from the view layer 280 to learn pose-invariant object representations by associating different view prototypes from the view layer 280 according to their temporal continuity provided by the reset signal from the Where system 130. This yields an identity confidence measure, which can be fed into a name layer 300 that groups different objects under the same user label, which may be obtained from an optional teacher 160. The optional teacher 160 shapes the association between objects and their labels and feeds this information from the Name layer 300 to the Object layer 290 and View layer 280 to the speed and accuracy of future object learning.

FIGS. 3A-3D provide an overview of how the OpenEye determines temporal object continuity. In block 602, an image sensor, which may or may not be mounted to the robot, obtains imagery of the robot's environment. One or more OpenEye processors translate one or more these images from the camera frame of reference to an allocentric frame of reference (e.g., a log-polar frame of reference) in block 604. The OpenEye processor then segments the translated images in block 606. Next, the OpenEye processor constructs a spatial shroud for a first image (block 608) based on the current position and orientation of the input sensor and uses the shroud to identify an object in the first image (block 610). It then translates, rotates, skews, and/or otherwise transforms the shroud to account for the sensor's change in orientation and/or position between acquisition of the first image and a second image (block 612).

The processor then determines if the transformed shroud maps to an object in the second image (block 614). If so, the processor determines that the object in the second image is the same as the object that appears in the first image and learns the object's location (e.g., stores a representation of the object, its features, and/or its position in memory for later retrieval). At this point, the processor may use an actuator to orient and/or position the sensor in order to image a different portion of the robot's environment. If the shroud does not overlap with an object sufficiently in the second image, the processor determines that the objects are different and updates its memory accordingly. The processor may then actuate the sensor to obtain additional images of the object and the surrounding portion of the robot's environment.

FIGS. 3B-3D illustrate the shroud construction and translation process. In FIG. 3B, the sensor is centered on a face 702, where the center is marked by the dashed lines through the field of view. The OpenEye processor shroud 704 is built around this face 702, shown by the gray shading in the diagram. After the sensor is reoriented and another image acquired, the shroud 704 is translated and rotated to compensate for the sensor motion. If the sensor is now centered on a location marked by the shroud 704 in FIG. 3C, the system identifies that this object is the same as the one previously viewed. If the sensor is instead centered on a location off of the shroud 704, as in FIG. 3D, the system identifies and learns views of a new object.

Note that the What system (aka the classifier or semantics module) can also contribute to controlling the Where system (aka the spatial attention module). In particular, if the What system has gathered enough evidence (namely, a certain number of classifications where confidence is high) about the foveated object, it may cause the Where system to stop foveating that object, producing Inhibition Of Return (IOR) for a few time steps in the future, so as to bias the visual system to classify other objects in the scene.

Implementations of the What and where Systems

The What system (spatial attention module) and the Where system (semantics module) can be implemented in hardware, firmware, software, or a suitable combination thereof. For example, the What and Where systems may be implemented as processor-implementable instructions that are stored in non-transient form in one or more memories located in or on a robot, such as a unmanned aerial, ground, or submersible vehicle. Some or all of the processor-implementable instructions may also be stored on remote memory, such memory in or accessible by a server that communicates with the robot via a wireless communication link (e.g., a radio-frequency or optical link).

The robot may include one or more processors that are coupled to the memory and configured to execute the instructions so as to implement the What and Where systems, including the individual modules shown in FIGS. 1 and 2A-2C. For example, the robot may execute the instructions with a central processing unit (CPU) and a graphics processing unit (GPU), e.g., as disclosed in U.S. Pat. No. 8,648,867, which is incorporated herein by reference in its entirety. The processor(s) can also be implemented as application specific integrated circuits (ASICs), field-programmable gate arrays (FPGAs), and/or other device or component as understood in the art.

In some embodiments, some or all of the processors may be located remotely—that is, not on or in the robot. For example, the processors (include GPUs) may be located in one or more smart phones, tablets, and/or single board computers (SBCs). The processors may also form part or all of a cluster computing environment, with each processor in the cluster dedicated to particular task or group of tasks. In these embodiments, the processors may communicate with sensors, actuators, and other devices and components on or in the robot via a suitable communications link, such as a radio-frequency or optical communications link.

Figure 4:
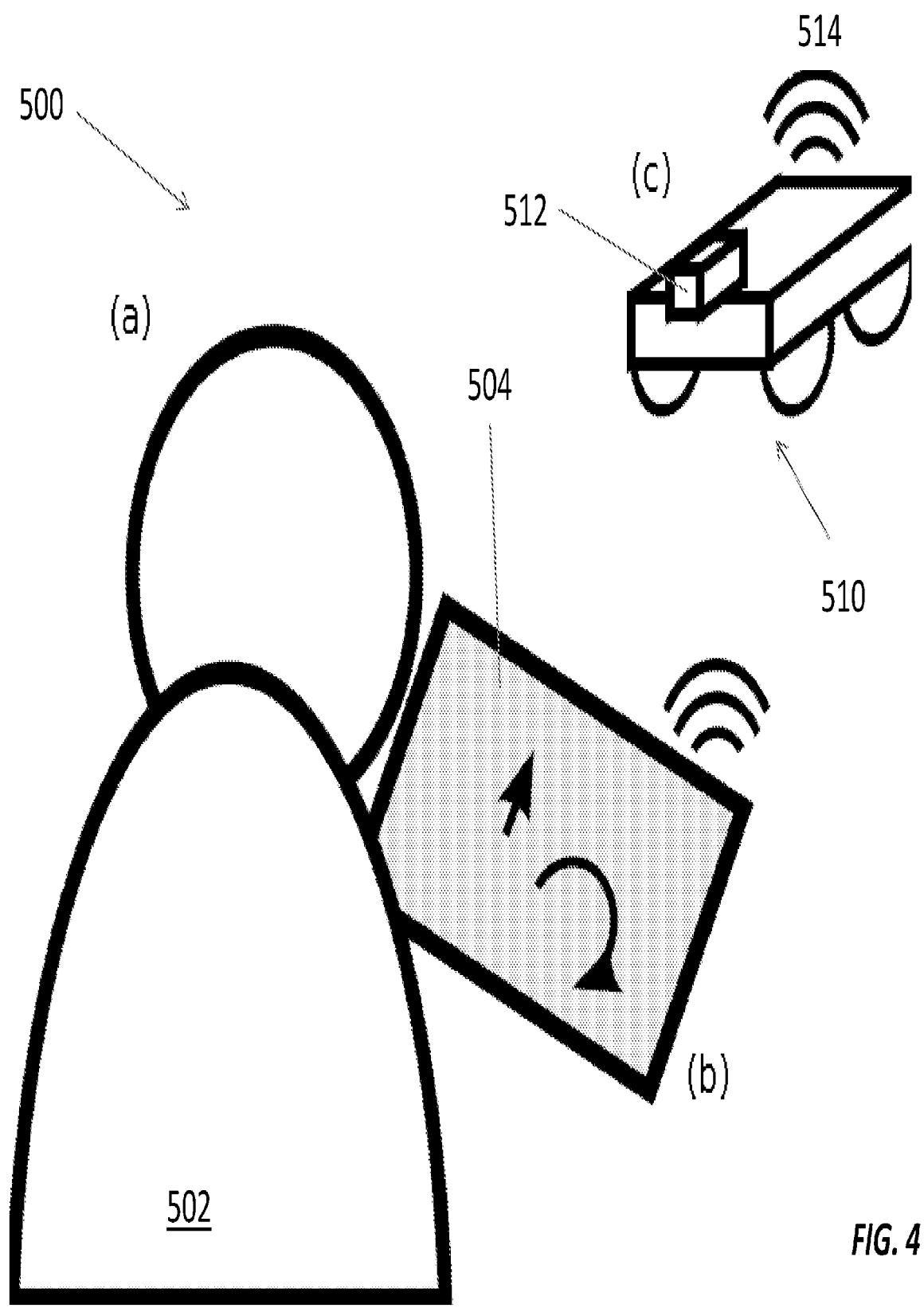
FIG. 4 illustrates control of a robot using the OpenEye system via a remote controller, such as a tablet or smartphone.

FIG. 4 illustrates an OpenEye system 500 used to control a wheeled robot 510. The OpenEye system 500 includes a computing device 504, such as a tablet computer or other electronic device with wireless capabilities, that is controlled by a user 502. The computing device 504 communicates with the robot 510, which includes an image sensor 512 and an antenna 514, via a wireless link. The user 502 issues commands to the robot 510 via software running on the computing device 504, a processor (not shown) on the robot 510, and/or on other cloud-based processors (not shown).

In operation, the image sensor 512 can be oriented and/or positioned either by the user when manually operating the robot or automatically by the software. For example, the image sensor 512 may be mounted on a pan/tilt stage, translation stage, or rotation stage that can be actuated to change the image sensor's orientation and/or position. The image sensor 512 may also have a (motorized) zoom lens that can be used to zoom in or out on certain portions of the environment. In addition, or instead, the image sensor 512 can be oriented or positioned as desired by moving the robot 510. In some cases, the image sensor 512 may static with respect to the robot 510; this is roughly equivalent to somebody without, say, neck and eye muscles. In order to change the static image sensor's point of view, the body of the robot rotates and/or moves, e.g., using wheels or legs for ground robots, propellers for drones, thrusters for submersible robots, etc.

Environment Module (120)

This Environment Module abstracts away the source of visual imagery (cameras, real or virtual, or other sensors, e.g. LIDAR) and applies sensor movement commands in the manner consistent with the environment in which OpenEye currently operates. OpenEye supports the following environments:

Static Scenes—e.g., JPEG, PNG images, etc.;
Dynamic Scenes—e.g., movie files (.avi, .mp4, etc.);
Camera—Real 3d visual world; and/or
Virtual Camera—virtual environment, e.g., based on the JMonkey game engine.

Concrete implementations of this module are specific to the environment, but the input and the output should comply with the specification below.

RGB Sensor (100)

RGB delivers the RGB image sampled from the environment as directed by the RGB Sensor Actuator. The later simulates eye movement by moving the camera.

Sensor Movement Actuator (110)

Sensor Movement Actuator implements sensor (e.g., camera) movement commands if they are supported by the environment, otherwise this module returns eye position in ego-centric coordinates.

Where System (130)

FIGS. 2A and 2B illustrate functions of the Where System, including producing a foveated view of the object to be interpreted by the What System, to select the next location to foveate based on sensory and internal semantic information, and to determine and track the position of objects in the visual field and return their coordinates. The diagram of the Where System is presented on FIG. 2B. All modules part of the Where System are enclosed in the module described in (130). The Where System receives the video image from the environment module and produces camera movement commands to be executed by the environment module (120). The Where System supplies the What System with the view of the object it currently looks at and the Reset signal, which marks the beginning of the object foveation sequence. The detailed description of the Where System modules is presented below.

Log-Polar Transformations

Several modules (230, 260, 270) perform transformation between log-polar and Cartesian encoding of the distance metric. OpenEye adheres to a bio-inspired log-polar transform of the input image, but the model can be used with different transform. The log-polar transform is applied to the RGB sensor subtending 136 degrees of visual angle, close to that reported in humans and other animals (Traver and Bernardino, 2010). The log-polar metric in space encoding is used across both OpenEye Where and What Systems and transformed back to the Cartesian metric by (230) only to reference the external world beyond the current view, which is required by the Environment Module (120), the Foveation Memory module (250), and the Inhibition of Return module (220) in the Where Pathway. All Log-polar transformation modules share the parameters that specify dimensions of log-polar $[w_s\ h_s]$ and Cartesian image $[W_s\ H_s]$.

Log-Polar Transformation of Retinal RGB Image (260)

The image sampled at the foveated location undergoes log-polar transformation that amounts to space-variant sampling with higher resolution in the foveal area and much coarser resolution that falls with eccentricity outside the foveal region (Traver and Bernardino, 2010). This provides some invariance to translation/rotation and to save computational bandwidth while at the same time to acquire details at the location of the image that present the highest interest and is the most effective for the image representation.

Log-Polar Transformation of Inhibition of Return (230)

Similarly to retinal image, inhibition of return undergoes log-polar transformation in order to prevent the HotSpot Selection Module (190) from repeated foveations.

Reverse Log-Polar Transformation of Inhibition of Return (270)

The HotSpot selected in the Log-polar view in sensor-centered coordinates (190) needs to be transformed back to Cartesian metric by (230) before it can be converted into sensor movement command by the Environment Sensor Movement Actuator (110).

Feature Extraction (240)

Feature Extraction (240) includes, but is not limited to, computation of luminance and color. Other features could include motion, or SIFT features (Lowe, 2004). "Features" can include, but are not limited to:

A property of an image that can be associated with each image location;

A scalar (e.g., luminance, 0-dimensions) or vector (e.g., color, 1 dimension);

A numerical (integer, or real, e.g. luminance, color) or binary (Boolean, e.g., is an edge associated with this particular pixel) value. More abstract properties (e.g., "edge-ness") can also be represented by a numerical feature—strength of the edge.

The description below specifies the features currently implemented in OpenEye, but the description below should not be intended to limit OpenEye applicability to these features alone.

Luminance, Color

Luminance and Color can be extracted from the Log-polar RGB Image.

Segmentation (180)

This module builds preliminary segmentation producing binary image that represent closed (bounded) regions (Suzuki & Abe, 1985). This is achieved by using OpenCV function findContours, which operates on edges produced by the Canny edge detector (Canny, 1986). The result is the image with pixels set to 1 at the locations that belong to the bounded regions.

Figure/Ground Segregation (180)

This module builds a shroud around the object at the center of the view. This is achieved via a seeded flood fill algorithm, which uses the OpenCV floodFill function. This algorithm fills a connected component starting from the center of the log-polar image produced by the segmentation module (180). Connectivity is determined by the brightness closeness of the neighbor pixels. As the result this step produces a shroud (Fazl et al., 2009), roughly fitting the form of the closed region that includes the foveated location (the center of the image).

The Figure/ground segregation module (180) can also be extended to accept input from the What System, for instance in the form of semantic information pertaining the identity of pixels which can be obtained via a fast processing of the visual information that bypasses the Where System. For instance, a separate What System can be trained to recognize, on a pixel-by-pixel basis, areas in the image. E.g., the separate What System can initially classify areas of the image as "sky", "grass", "road", and this information can be used as input to the Figure/ground segregation module (180) as additional input to drive figure/ground segregation.

Hot Spot Selection (190)

This module produces a vector that determines the next foveation location. The module determines the most salient locations on the image by using the OpenCV function goodFeaturesToTrack, which finds the most prominent corners in the image as described in (Shi and Tomasi, 1994). The image passed to the corner finding algorithm is the luminance feature produced by the feature extraction module (240). The Inhibition of Return signal produced by the log-polar transformation module (230) disables the non-zero locations on the image to be selected as the next foveation position.

Temporal Object Continuity (200)

In order to build view invariant object identity, OpenEye may maintain temporal continuity between subsequent object foveations. OpenEye determines if the next foveation location falls off the current object surface in order to signal the object recognition system that building of the new object identity begins or continues. This is achieved via producing the RESET signal, which is set to 1 in the next cycle when the selected new foveation location falls off the shroud (output of module 210) built from seeded activity in the center point of the view.

In OpenEye, temporal continuity is based on the ability to learn the location of the object selected during the foveation (camera movement) cycle. The location is learned by translating pixel position corresponding to the object in the camera-centered coordinates into object location in allocentric coordinates.

To ensure awareness of previously learned objects, their locations are translated from allocentric coordinates stored in object memory into camera-centered representation at each foveation cycle.

Similarly to objects, hot spot pixel position is translated to allocentric coordinates. In the next foveation cycle, the position of hotspot is recomputed forming the shroud around the foveated object by seeded filling-in starting from the hotspot selected at the previous foveation cycle.

Foveation Memory (250)

The term "foveation" adopted below is borrowed from the neuroscience literature, where foveation represents the location of eye fixation. Foveation memory in OpenEye represents past foveation activity over the visual image. When OpenEye operates on static images, foveation means sampling of the image, at a particular (foveated) location. Usually size of the sampled image is much smaller than the entire image(scene) size. When OpenEye operates in real 3D or virtual environment, foveation is sampling of that environment as the result of real or virtual camera movement. The visual memory is maintained over the spatial area that depends on the environment. It could amount to the entire image as in the case of static scene environment, or over the region of space that is currently in the view as in the case of movies or virtual environment. Foveation memory inhibits foveations at the locations that have been foveated in the past. After making a camera movement, OpenEye sets foveation activity at the maximum value (255), this activity decays with each foveation and eventually, when it decays to 0, the location is enabled for new foveations. The Foveation Memory is maintained in the image-centered coordinate frame. However, the input (Sensor Position, 150) is provided in ego-centered coordinates.

The history gets updated with each new foveation cycles. The decay is implemented as a decrement by one with each foveation step. Initial value immediately after foveation is set to FMAX. This means that the same location cannot be foveated at least the next FMAX cycles.

Inhibition of Return (220)

The purpose of the Inhibition of Return module (220) is to prevent repeated foveations at the same spatial location. To achieve that this module extracts the section of the foveation history around the next foveation location that falls in the view of the next saccade.

Input:

| Name | Data Type | Data Dimensions | Element Type | Element Dimensions | Metric | Base |
| --- | --- | --- | --- | --- | --- | --- |
| Sensor Position $I_s = [x, y]$ | Vector | 0 | Unsigned, Byte | 2 | Cartesian | Ego-centered |
| Foveation Memory $I_f$ | Scalar Field | $[W_f, H_f]$ | Unsigned Byte | 0 | Cartesian | Image-centered |

Output:

| Name | Data Type | Data Dimensions | Element Type | Element Dimensions | Metric | Base |
|---|---|---|---|---|---|---|
| Inhibition of return O | Scalar Field | [$W_s$, $H_s$] | Unsigned Byte | 0 | Cartesian | Sensor-centered |

Processing:

$$\begin{cases} I_f(X, Y) & 0 < X < W_I; 0 < Y < H_I \\ 0 & X > 0 \mid X > W_I \mid Y < 0 \mid Y > H_I, \end{cases}$$

where $$Y = y + i - i_0; X = x + j - j_0;$$

$$i_0 = \frac{(H_s - 1)}{2}; j_0 = \frac{(W_s - 1)}{2}.$$

What System (150)

As shown in FIGS. 2-4, the What System (150) learns the identities of objects and visual scenes. The What System may, for example, group object views and learn them as a unified entity; maintain a lifelong memory while preventing memory degradation and saturation; make inferences about views acquired from the Where System, which objects they belong to, and the names associated with those objects; bias camera movements in the Where System in order to intelligently guide image sampling; and provide an interface by which an external user can communicate with and leverage the system's knowledge.

The What System is implemented as a series of hierarchically organized classifiers that perform unsupervised view clustering, classification of view categories into object categories based on the reset signal from the Where System, and supervised or unsupervised categorization of objects into name categories. After learning occurs, the activation of a name category primes the What system by inhibiting those objects and views that are not associated with that name category, further tuning the system by discouraging views from being shared between multiple objects and names. The activation of a name category can come from a bottom-up activation of a newly viewed object, persistent activation caused by a previously viewed object, or through external activation by another system or user. This external activation is provided by a Teacher (160) that represents the correct name of the foveated object to aid learning. OpenEye does not function in different modes to facilitate training or testing mechanisms, and it does not require a reset of the system upon transition to a new scene. FIG. 2C highlights the high level system diagram of the What Pathway (170), which includes the What System (150) and the Teacher (160).

The inspiration for hierarchical clustering of views into objects and names is detailed in the ARTScan model of visual learning (Fazl, Grossberg, and Mingolla, 2009). The Adaptive Resonance Theory (ART) learning scheme has been altered from this work by replacing the learning system of the view layer with a variant of Fuzzy Simplified ART (f-sART; Baraldi and Alpaydin, 1998); differences between the OpenEye view layer and f-sART are detailed in Section 4.1. Additionally, the specific mechanisms and learning rules implemented in the object and name layers have been altered in order to enhance learning quality and to allow the system to operate with or without an external teacher; these differences are described in their respective sections.

The following sections describe the function of the What Pathway, shown in FIG. 2C, in detail. The View layer (280), described herein, clusters shroud-gated visual representations of object views according to their feature similarity. The Object layer (290), described herein, learns pose-invariant object representations by associating different view prototypes according to their temporal continuity provided by the reset signal from the Where system. The Name layer (300), described herein, further groups different objects under the same user label if given from an optionally present Teacher (160), described herein. As an external teacher shapes the association between objects and their labels, this information is fed back from the Name layer to the Object and View layers to improve the speed and accuracy of future object learning.

View Layer (280)

The first task of the What pathway is to cluster the shroud-determined input surface properties generated from the Where System into consistent view categories, which is performed by the View layer (280). This layer learns a library of typical views of a set of objects in different poses and spatial configurations; a set of views connected to the same object category node, described herein, should correspond to a set of 2D feature views of an object that together represent the view of this object from varying 3D angles, distances, lighting conditions, and other variations in viewing experienced by the OpenEye system. While the log-polar representation provides some form of invariance to scale and translation, this learning mechanism is at the core of how OpenEye learns invariant object and scene representations. The features received by the view layer comprise a set of m different analog values associated with each of a set of pixels. The value of the shroud at that pixel determines whether those m features will be part of the comparison that determines which object view most closely matches the currently viewed object. These features can include luminance or color information, the presence and orientation of local contours, local motion information denoted by optic flow, stereo disparity, binary feature descriptors such ORB representations (Rublee, Rabaud, Konolige, & Bradski, 2011), or any combination thereof that can be produced by the Where system.

The unsupervised learning network that does this clustering is a simplified fuzzy Adaptive Resonance Theory (f-sART) network (Baraldi & Parmiggian, 1997; Baraldi & Alpaydin, 1998; Baraldi & Alpaydin, 2002). A thorough description of adaptive resonance theory is presented elsewhere (Carpenter & Grossberg, 1987; Carpenter & Grossberg, & Rosen, 1991; Carpenter & Grossberg, 1995). ART clarifies how matching between bottom-up input and top-down representations enables fast and stable learning of arbitrary input patterns. Most recently, ART has been shown to be biologically plausible at the level of laminar multi-compartment spiking neurons, and consistent with experimental data (synchronous matching ART; Grossberg & Versace, 2008)—a task that competing models such as hierarchical temporal memories have not yet achieved (George & Hawkins, 2009).

Simplified fuzzy ART, or f-sART, departs from the classic fuzzy ART formulation in three ways:

1) The category activation function and presentation-to-category matching function are both bidirectional and symmetric. This symmetry simplifies the process of finding a resonant neuron to direct calculation rather than an iterative ART search cycle.

2) Fuzzy sART imposes soft-competitive learning rules whereby a view can activate a resonant domain instead of a single resonant view neuron, allowing non-winning weights to be updated as well as the winning category weights. The soft-competitive learning rules of f-sART share properties of Kohonen's self-organizing maps, which have the added advantage of autonomously determining sparsity at the view category layer.

3) Fuzzy ART is not a consistent statistical learning system in that its learned category clusters depend on the order of sample presentation. Fuzzy sART partially overcomes this limitation by training in repeated batches and removing redundant or infrequently used categories between training batches.

OpenEye leverages improvements (1) and (2) for fast category matching and the creation of robust distributed object representations. Because OpenEye learns online and without forced repetition, however, and the dataset size is unknown beforehand and depends on the pattern of Where system foveations, OpenEye can leverage a novel category consolidation technique described herein.

Unlike many unsupervised learning systems, f-sART only takes two user defined parameters, vigilance (a parameter that determines how close of a match is close enough for resonance and learning to occur) and $\tau$ (a parameter that mediates how many activations of the same category node are required for it to become a stable representation for the category). This mitigates the problem of parameter tuning and offloads as much of the work as possible to autonomous mechanisms that self-tune sparsity of the view category code. These properties balance biological plausibility, simplicity, and accuracy in a way that make f-sART a practical OpenEye view clustering system.

The View layer (280) functionality can be broken down into three sub-processes described below:

1) determining the winning view category neuron and its resonant domain;

2) updating the state of the view category nodes in the resonant domain; and 3) producing a disambiguation map that can prime the Where System for new foveation positions that can efficiently determine the currently viewed object's identity.

A summary of the input-output relationships of the View layer is given in the following table.

Input:

| Name | Data Type | Data Dimensions | Element Type | Element Dimensions | Variable | Equation |
|---|---|---|---|---|---|---|
| Features | Scalar Field | $[w_s, h_s]$ (log-polar, sensor-centered) | Unsigned, Byte | m | $\vec{x}$ | 240 ($O_L$) |
| Shroud | Scalar Field | $[w_s, h_s]$ (log-polar, sensor-centered) | Binary, Byte | 1 | $\vec{A}$ | 210 (O) |
| Object category activity | Scalar Field | [j] | Floating Point | 1 | $\vec{o}^v$ | 280.7a |
| Name category activity | Scalar Field | [j] | Floating point | 1 | $\vec{n}^v$ | 280.2a |

Output:

| Name | Data Type | Data Dimensions | Element Type | Element Dimensions | Variable | Equation |
|---|---|---|---|---|---|---|
| View category activity | Scalar Field | [j] | Floating point | 1 | $\vec{v}$ | 280.3 |
| Disambiguation map | Scalar Field | $[w_s, h_s]$ (log-polar, sensor-centered) | Floating point | 1 | $\vec{y}$ | 280.7 |

Persistent State:

| Name | Data Type | Data Dimensions | Element Type | Element Dimensions | Variable | Equation |
|---|---|---|---|---|---|---|
| View templates | Vector Field | [j] | Floating point | $[w_s \times h_s \times m]$ | $W^{xv}$ | 280.6 |

-continued

| Name | Data Type | Data Dimensions | Element Type | Element Dimensions | Variable | Equation |
|---|---|---|---|---|---|---|
| View template ages | Scalar Field | [j] | Floating point | 1 | $\vec{t}$ | 280.4 |

View Output and the Resonant Domain

To determine which view category neuron best matches the given view input, we calculate the vector degree match between the input and each view category neuron (Equation 280.1). This match is determined as a Gaussian function of Euclidean distance between input and weights in feature space; the width of this Gaussian is automatically adjusted by the size of the shroud in order to retain sensitivity to different inputs regardless of the feature vector's dimensionality. The view category neuron with the highest vector degree match to the input is considered to be the winning category node. $\vec{W}_j^{xv}$ represents the weight vector connecting the input feature scalar field, $\vec{x}$, to the $j^{th}$ view category output node. The input feature field is comprised of the luminance values of the 2D shroud-modified contour reshaped into one long vector, while $\vec{W}_j^{xv}$ can be thought of as the $j^{th}$ data element of the $W^{xv}$ vector field. The vector degree match $M_j$ of the input $\vec{x}$ to a particular view prototype j is given by $$M_j(\vec{x}, \vec{A}, W^{xv}) = \exp\left(\frac{-(\vec{A} \otimes (\vec{x} - \vec{W}_j^{xv}))^T (\vec{A} \otimes (\vec{x} - \vec{W}_j^{xv}))}{\vec{A}^T \vec{A}}\right), \quad (280.1)$$

$$B_j = \begin{cases} \max(M_j - \rho^v, 0) & n_j^v > 0.2 \text{ and } j = h \in \{1, 2, ..., 9\} \\ 0 & \text{otherwise} \end{cases}, \quad (280.2)$$

where a cell's resonant domain value $B_j$ is above zero if the match exceeds the user-set vigilance parameter $\rho^v$, the view is associated with the currently active top-down priming signal from the name layer $n_j^v$, and the cell wins a lateral competition implemented as a ranking denoted by the index h. More specifically, top-down priming from the name to view layers is defined as $$\vec{n}^v = \begin{cases} f_\infty(W^{vo} W^{on} \vec{n}) & R \vee T \\ \vec{1} & \text{otherwise} \end{cases}, \quad (280.2a)$$

where $W^{vo}$ are the weights from view to object cells, $W^{on}$ are the weights from object to name layers, $\vec{n}$ is the output of the name layer described herein, R∨T is true either when there is temporal continuity defined as a lack of reset signal from the Where Pathway (R) or when a teaching signal is present (T), and $f_\infty(\bullet)$ is a normalization function given by $$f_a(\vec{y}) = \frac{\vec{y}}{\sqrt[a]{\Sigma_i |y_i|^a}}. \quad (280.2a1)$$

Note that, since all simulated classifier neuron activities are nonnegative, some of these normalization equations can be programmed in a simplified form, such a $$f_1(\vec{y}) = \vec{y}/\Sigma_i y_i \text{ and } f_\infty(\vec{y}) = \vec{y}/\max_i y_i.$$

Cells are also ranked by their match, shown as the index h and described by the ordering $$M_h \geq M_{h+1} \quad (280.2b)$$

The view layer successfully matches the input if the winning node passes vigilance and is associated with the teacher's activated name, given by the condition $B_1 > 0$. If this condition is false, then the view layer attempts to create a new node with a weight vector identical to the currently viewed feature vector. If there are no new nodes available, however, the view layer does not learn, and its output is a vector of all zeros except for that of the winning node, whose activity is set to its vector degree match regardless of whether it passes vigilance.

The output of the view layer is a vector of zeros except for those neurons in the resonant domain, whose activities are proportional to their level of match to the input. Except for when match fails and the view layer is out of neurons, the activities are normalized according to $$\vec{v} = f_\infty(\vec{B}) \quad (280.3)$$

so that the maximal value is always 1.

View Category Representation Update

Once the winning category node and its resonant domain are established, the learning rates of these active view category neurons are calculated. The learning rate is a function of neuron membership and neuron match rank, both of which become lower with the neuron age that increases when it is in the resonant domain. The membership function of a neuron is affected both by its match score and by its match rank; the winning node has the highest membership, while the ninth best matching node has a low membership even if its vector degree match score is high.

The age of a neuron increases with each time it is selected as a winning or resonant neuron that passes resonance, where the winning node ages more quickly than a lower ranked node in the resonant domain. For a given value of the membership function, the learning rate starts high and slowly decreases with neuron age; qualitatively, this symbolizes a stiffening of learning the more times a neuron is activated by a view. The parameter τ controls how fast the learning rate changes as neurons age. Alternatively, one can think of τ as mediating how many activations of the same category node are required for the node to become a stable representation for the category. Since a weaker agreement between input and category layer leads to a more distributed code in the category layer, τ is one of the dominant factors that mediate how quickly a distributed code becomes sparse. τ is one of two user-specified parameters that do not change throughout the simulation.

Neuron Age.

The age of a neuron $t_h$ in the resonant domain is updated after it learns so that it becomes a stable category representation over time. The neuron ages more slowly if it has a lower rank in the resonant domain; this rate is controlled by the equation $$t_h \leftarrow t_h + [n_j^v > 0.2] \cdot \max(10-h, 0), \quad (280.4)$$

where [·] denotes an Iverson bracket (1 if the interior condition is true, 0 otherwise) that stops neuron aging if it does not learn from a top-down name mismatch, and the other term controls neuron aging according to its resonant domain rank h.

Weight Wpdate.

The input view prototypes are updated according to a node-depending learning rate that depends on a number of factors. The total learning rate $\alpha_j^v$ of for a particular view node is a product of the match ($q_1$) and rank ($s_1$) learning rates $$\alpha_j^v = q_j s_j. \quad (280.5)$$

The match learning rate is dependent both on the level of feature match to the input and neuron age $t_j$. This rate is given by the equation $$q_j = \begin{cases} C_j(\varepsilon/C_j)^{t_j/\tau} & C_j \geq \varepsilon \\ \varepsilon(C_j/\varepsilon)^{t_j/\tau} & \text{otherwise} \end{cases} \quad (280.5a)$$

where $\varepsilon = 0.01$ is small and $C_j$ is a normalized match score:

$$\vec{C} = f_1(\vec{B}). \quad (280.5a1)$$

The rank learning rate is dependent both the cell's resonant domain rank and on its age; when the neuron is young, it is more likely to learn even if its rank in the resonant domain is low. This rate is $$s_j = \exp\left(\frac{(1-h)}{\sigma_j}\right), \quad (280.5b)$$

where the age-based neighborhood spread constant is $$\sigma = 5(0.01/5)^{t/\tau} \quad (280.5b1)$$

and τ is a user-defined time constant that specifies how quickly the network stabilizes. Finally the view layer weights $W^{xv}$ for each view node j are updated according to the rule $$\vec{W}_j^{xv} \leftarrow (1-\vec{A}) \otimes \vec{W}_j^{xv} + \vec{A} \otimes ((1-\alpha_j^v)\vec{W}_j^{xv} - \alpha_j^v \vec{x}), \quad (280.6)$$

where the weight is mixed with the input $\vec{x}$ in proportion to the match-, rank-, and age-based learning rate $\alpha_j^v$ and is gated by the shroud A through element-wise multiplication denoted by the ⊗ symbol.

Disambiguation Map (310)

A single input view passed to the What System can activate multiple view, object, and name nodes. Although the output of each of these layers is sparse, the system output can occasionally be unsure about object identity in the absence of an external teacher. This is called "object ambiguity", as a single view of an object can be associated with many objects.

To facilitate object disambiguation, OpenEye uses a novel, dynamically constructed, disambiguation map that suggests potential saccade targets to the Where Pathway that would maximally inform the What System as to which of the potential object representations best matches the actual viewed object. This map compares those views within the resonant domain that are activating disparate object categories, and activates the disambiguation map in the areas where input and view prototypes disagree.

The map is currently defined as the weighted average of the feature differences between the input $\vec{x}$ and weight templates $\vec{W}_j^{xv}$, where each template is mixed only if a view $v_j$ in the resonant domain is coactive with its associated object category of $o_j^v$. Specifically, the disambiguation map $\vec{\gamma}$ is defined as $$\vec{\gamma} = \frac{\Sigma_j o_j^v v_j |\vec{W}_j^{xv} - \vec{x}|}{\Sigma_j o_j^v v_j}, \quad (280.7)$$

where $o_j^v$ is the feedback activity of the object category layer to a particular view category j, whose activities are given by $$\vec{o}^v o = f_\infty(W^{vo} \vec{o}). \quad (280.7a)$$

Note that equation 280.7 could be modified to include multiple features by including a sum over features m.

Object Layer (290)

Once the View layer (280) in the What System produces view categories that are excited by the shroud-modified contour, the view category neurons are then grouped into object categories—the goal being to determine which views should be bound to a consistent object representation. Intuitively, the Object layer (290, FIG. 2C) makes sure that views of the same object, e.g., different poses of a cup, a car, or a person, all map to the same object node that represents the collective views defining that specific cup, car, or person. The inputs to the object category layer include: the view-category output from f-sART; the reset signal from the Where System; and feedback input from the name category.

The output of the object category layer are the sparse activities of object category neurons that are activated in response to bottom-up view input and top-down name input, produced as a simplified model of a Recurrent Competitive Field (RCF) neural network (Grossberg, 1973). Unlike previous models, the weights from view to object neurons are learned through a modified form of Oj a's rule, an associative learning rule that implements favorable input clustering properties such as weight normalization and a distribution of weights that reflects the principle source of variation across a dataset (Oja, 1982).

The object category functionality can be broken down into two sub-processes:

1) determining the winning object category neurons; and 2) updating the weights between the view category nodes and the winning object category neurons.

A summary of the input-output relationships of the Object layer is given in the following table.

Input:

| Name | Data Type | Data Dimensions | Element Type | Element Dimensions | Variable | Equation |
|---|---|---|---|---|---|---|
| View category activity | Scalar Field | [j] | Floating point | 1 | $\vec{v}^o$ | 290.1a |
| Name category activity | Scalar Field | [k] | Floating point | 1 | $\vec{n}^o$ | 290.1b |
| RESET | Scalar | 1 | Binary Byte | 1 | R | 200 (O) |

Output:

| Name | Data Type | Data Dimensions | Element Type | Element Dimensions | Variable | Equation |
|---|---|---|---|---|---|---|
| Object category activity | Scalar Field | [k] | Floating point | 1 | $\vec{o}$ | 290.2 |
| Identity confidence | Scalar | 1 | Byte, unsigned | 1 | c | 290.3 |

Persistent State:

| Name | Data Type | Data Dimensions | Element Type | Element Dimensions | Variable | Equation |
|---|---|---|---|---|---|---|
| Object categories | Vector Field | [k] | Floating point | [j] | $W^{vo}$ | 290.4 |
| Object category internal state | Scalar Field | [k] | Floating point | 1 | $\vec{u}$ | 290.1 |

Object Category Output

The object category layer's output is determined both by feedforward/feedback input and by its previous activation saved in its internal state. This internal state is modeled by a normalized additive neuron equation that approximates the action of an RCF; this layer takes as input: the active view categories based on the current view; and direct feedback from the name layer that primes previously made associations between a current label and a set of candidate object categories.

The object category winners are defined as those neurons whose view-to-object network weights are more similar to the active view category layer than a fixed vigilance criterion, constrained by top-down feedback signaling whether that view belongs to the current active name category as well. If none of the object category neurons meet this fixed resonance criterion, a new neuron is created as a new object category to be associated with the current view.

A dominant feature in OpenEye is that the Where System should inform the What System when the foveated object has changed; until that time, the What System should keep grouping views into the same object category. Although the selection of the object category winners happens at each view presentation, without the presence of a reset signal, feedback from the name category layer will keep the object layer locked in its current activation state regardless of the view layer's activity. This allows the What System to associate multiple, disparate views of the same surface/object. This persistent state is broken and reset when the Where Pathway notifies the object category layer that the current view is of a different object in the scene. In the event of a reset signal, the category layer's activity is set to zero, and top down priming is ignored unless the name layer is strongly activated by an external teaching signal.

The object category internal state vector it is determined by the discrete update equation $$\vec{u} \leftarrow f_\infty(0.9\vec{u}[R]+(1-\alpha^o)\vec{v}^o+\alpha^o\vec{n}^o[R\backslash/T]), \quad (290.1)$$

where [R] is an Iverson bracket that is 1 in the absence of a reset signal and clears the layer's memory during a reset, [R\/T] is an Iverson bracket that clears top-down priming during a reset in the absence of a teacher T, $\alpha^o=0.6$ is a user-defined mixing fraction between feedforward and feedback input, $\vec{v}^o$ is the bottom-up input from the view layer given by $$\vec{v}^o=f_\infty((W^{vo})^T\vec{v}), \quad (290.1a)$$

and $\vec{n}^o$ is the top-down feedback from the name layer given by $$\vec{n}^o=f_\infty(W^{no}\vec{n}). \quad (290.1b)$$

The output $\vec{o}$ of the object category layer are those cell activities that exceed a user-defined activity threshold $\rho^o=0.55$; these sparse activations are then normalized by the equation $$\vec{o}=f_\infty(\max(\vec{u}-\rho^o,0)) \quad (290.2)$$

so that the winning object category activity is set to 1.

Once the What System has either successfully recognized the currently viewed object as an instance a previously learned category or learned a new object, the Where System is informed of this recognition in order to mark the entire object's extent as unnecessary for further viewing. This recognition signal can be used as a feedback signal to triggers the inhibition of return mechanism, which inhibits the need to sample additional views of the recognized object. The Identity confidence of the What system, c, is defined as $$c=1/\Sigma_k o_k, \qquad (290.3)$$

which is inversely proportional to the total object layer activity. If only one object category node is active, then c=1, signaling successful recognition so that the Where system can add the entire object's spatial extent to the Inhibition of return map (Box 220). If multiple objects are simultaneously active, the identity confidence decreases, signaling the Where system that the currently viewed object requires more foveations to be unambiguously identified. In this case the What system simultaneously provides a Disambiguation map (Equation 280.7) that suggests foveation points that may resolve the ambiguity and increase identity confidence.

Object Category Weight Update

Once the object category winners are selected, learning can occur to associate the active view categories with the selected object category. The object category's learning rule is a modified form of Oja's rule (Oja, 1982) that is equivalent to using Oja's rule to learn the mapping from object to view category layers, which is a novel rule present only in OpenEye. This reversal is useful because many views map onto a single category, where most views are inactive at once. Oja's rule is post-synaptically gated, so learning the map from view to object categories would cause the decay of most rarely active view associations with a more frequently active object category. Learning the reverse map with Oja's rule allows this same postsynaptic gating to produce a sparse and consistent one-to-many mapping from object categories to views. The learning rate of this weight update, $\eta$, takes on a different value whether the teaching signal at the name layer is present (supervised learning) or absent (unsupervised).

The weights $W^{vo}$ between view and object categories are described for each synapse associating view j with object k by the equation $$W_{jk}^{vo} \leftarrow W_{jk}^{vo} + \eta v_j(o_k - W_{jk}^{vo} v_j), \qquad (290.4)$$

where $\eta$ is a teacher-dependent learning rate. When the teacher is present, $\eta=0.5$, and when the teacher is absent, these associations are learned at the slower rate of $\eta=0.05$.

Name Layer (300)

The last hierarchical stage of the What System is the name category classifier. The name category network groups different object category neurons with name category neurons using an externally provided teaching signal of the object name that may be present, partially present, or entirely absent.

The name category functionality can be broken down into two sub-processes:
1) determining the winning name category neurons; and
2) updating the weights between the object category nodes and the winning name category neurons.

A summary of the input-output relationship of the Name layer is given in the following table.

Input:

| Name | Data Type | Data Dimensions | Element Type | Element Dimensions | Variable | Equation |
|---|---|---|---|---|---|---|
| Object category activity | Scalar Field | [k] | Floating point | 1 | $\vec{o}^n$ | 300.1a |
| External Label | String | 1 | | | | N/A |

Output:

| Name | Data Type | Data Dimensions | Element Type | Element Dimensions | Variable | Equation |
|---|---|---|---|---|---|---|
| Name category activity | Scalar Field | [l] | Floating point | 1 | $\vec{n}$ | 300.2 |
| Object label | String | 1 | | | | N/A |

Persistent State:

| Name | Data Type | Data Dimensions | Element Type | Element Dimensions | Variable | Equation |
|---|---|---|---|---|---|---|
| Name categories | Vector Field | [l] | Floating point | [k] | $W^{on}$ | 300.3 |
| Name category internal state | Scalar Field | [l] | Floating point | 1 | $\vec{p}$ | 300.1 |
| Label map | String Dictionary | [l] | Floating point | [l] | | N/A |

Name Category Output

The object category layer's internal state is modeled by a normalized additive neuron equation that approximates the action of an RCF; this network takes as input the object category winners; and an optional, external teaching signal with the object name.

Similarly to the object layer, the bottom-up name category winners are defined as the neuron whose object-to-name network weights are sufficiently similar to the active object category layer to pass a fixed vigilance criterion. A teaching signal unambiguously specifies the name layer (and often object layer) activity values in order to consistently link object category representations with string labels that can be used by an end-user to recall or search for particular objects and views.

The name category output is a function of its internal state vector determined by the discrete update equation $$\vec{p} \leftarrow f_\infty(0.9\vec{p} + (1-\alpha^n)\vec{o}^n + \alpha^n \vec{\Omega}), \quad (300.1)$$

where $\alpha^n = 0.6$ is a user-defined mixing fraction between feedforward and feedback input, $\vec{\Omega}$ is a binary vector from an external teacher, set to all zeros except for the node associated with a particular semantic label (or set to all zeros in the absence of a teacher), and $\vec{o}^n$ is the bottom-up input from the object layer given by $$\vec{o}^n = f_\infty((W^{on})^T \vec{o}). \quad (300.1a)$$

The name layer can create a top-down priming vector in response to an optional input from an external Teacher (160) because it contains a dictionary that maps string labels to name node indices. Upon receiving a label from the teacher, the name layer checks whether the label already exists in the dictionary; if so, it creates a vector that strongly activates that name layer node. Feedback from the name layer to the object and view layers ensures that learning is then restricted to associating those views and objects that match the current teacher label. If the label has never been seen before, the name layer creates a node and associates the current view and object with that name. After this learning, the name layer can also recall a label by returning the string label associated with the maximally active name category node.

The output $\vec{o}$ of the name category layer are those cell activities that exceed a user-defined activity threshold $\rho^o = 0.35$; these sparse activations are then normalized by the equation $$\vec{n} = f_\infty(\max(\vec{p} - \rho^o, 0)) \quad (300.2)$$

so that the maximal name category layer output value is always 1.

Name Category Representation Update

Once a name category winner is selected, learning can occur to associate the active object category with the selected name category. Similarly to the object category layer, the name category learning rule is a modified form of Oja's rule that is equivalent to using Oja's rule to learn the mapping from name to object categories (Equation 36) for the same reasons discussed in Section 3.2.2. Similarly to object category learning, the learning rate, takes on a different value whether the teaching signal at the name layer is present (supervised learning) versus absent (unsupervised).

The weights $W^{on}$ between object and name categories are given by a learning rule that is equivalent to Oja's rule when learning the association from name categories to object categories, described for each synapse associating object k with name $\ell$ by the equation $$W_{k\ell}^{on} \leftarrow W_{k\ell}^{on} + \eta o_k(n_\ell - W_{k\ell}^{on} o_k) \quad (300.3)$$

where $\eta$ is a learning rate whose dependence on the existence of an external teacher is described after Equation 290.3.

Teacher (160)

The teaching signal, supplied by the Teacher (160), is an optional string label that informs the What System about the currently-viewed object's name. The teacher supplies a string label to OpenEye, which automatically assigns that string to a name layer category node. The teaching signal is then transformed by the Name layer (290, FIG. 2C) into a vector whose value is 0 in all locations with the exception of the one corresponding to the object name (whose value is 1). When the teaching signal is present, the top-level classifier of the What System (the object-to-name layer) is said to be working in a supervised mode. However, it is important to note that even in supervised mode, the input-to-view and view-to-object layers continue to learn in a largely unsupervised fashion.

The Teacher is separately implemented for a variety of applications, so no explicit equations are listed for its function. Depending on the application, a teacher can either take the form of categorized class outputs in a standard machine learning database, a string label provided by an external resource such as an Internet image search, or a label provided by a human user, enabling interactive correction or querying of the What system. In order to produce a string label, the teacher should have separate access to the environment as well as knowledge of where the model is looking; the camera/sensor position is given by the Camera movement actuator (120). The following table summarizes the input/output relationship of the Teacher.

Input:

| Name | Data Type | Data Dimensions | Element Type | Element Dimensions | Variable | Equation |
|---|---|---|---|---|---|---|
| Sensor (Eye) Position | Vector | 1 (Cartesian, Ego-centered) | Unsigned, Byte | 2 | | 110 (O) |

Output:

| Name | Data Type | Data Dimensions | Element Type | Element Dimensions | Variable | Equation |
|---|---|---|---|---|---|---|
| External Label | String | 1 | | | | N/A |

Alternative OpenEye What System: Spatio-Temporal Classification

An alternative classifier architecture for (280) and (290) is presented here which includes classifying information at different spatial and temporal scales. Low-level changes in input (e.g., image) features are often associated with a stable higher-order category. For instance, in vision, object rotation around its axis, or scale distortion by a moving observer, causes changes in low-level features while a top-level category (e.g., the representation of the object identity) remains stable. Hierarchical models have the advantage of capturing these relationships and autonomously building categorical/causal relationships among low and high-level features. The size of the hierarchy scales in response to the changing complexity of the underlying sense data.

OpenEye classifiers in the What System can be expanded to include temporal relationships between sensory or higher-order patterns. The proposed method provides a hierarchical biologically-inspired classification and prediction algorithm system for spatio-temporal classification that further extends the Adaptive Resonance Theory to enable categorization and prediction of temporal sequences in real time through the following innovations:

A predictive subsystem, activated upon recognition of a currently presented category, which learns to signal and prime for the most common input that appears next in a sequence. This predictive subsystem robustly learns short sequences by operating on categories of events rather than individual input patterns, and the learned knowledge is easily extracted as a transition probability matrix among learned clusters of sensor states.

A new learning rule for the predictive subsystem that allows for temporally delayed learning. This learning rule will couple the temporal delay of predictive layer learning to an ART parameter, vigilance, which controls the granularity of learned categories. This same component will also control the rate of learning relative to the input data stream, providing a way of adaptively partitioning a temporally continuous input into discrete sequences of events. The combination of a new predictive subsystem and a new learning rule will lead to a novel ART implementation, named temporal ART, or tART.

tART modules can be stacked into a hierarchy able to simultaneously learn at multiple scales of complexity in time and space.

FIGS. 5A and 5B illustrate an implementation of the tART model. FIG. 5A shows that the tART model expands on ART systems by adding a layer of nodes (F3) paired by direct input with category nodes in layer F2. Connectors with arrowheads are direct excitatory connections; connectors with triangles are adaptive weights that store learned patterns. (i) Upon presentation of an input pattern that activates F1 nodes to various degrees (fill color of circles in F1 rectangular box, darker is more active), category nodes in F2 compete in the ART search cycle to find the best match. (ii) Once a single category node is active after F2 competition, its corresponding sequence learning node in F3 is activated. (iii) Upon presentation of the next pattern, the feedback connection weights from layer F3 to F2 can prime F2 during the ART search cycle to suggest a preferred category in ambiguous cases. (iv) When the second input pattern is categorized, a connection between the previously active F3 node and the currently active F2 node is strengthened to learn a temporal sequence of categories.

FIG. 5B shows a hierarchy of tART modules that can learn increasingly complex patterns and increasingly long category sequences. The categories at higher levels learn a compressed sequence structure that is abstracted from the low-level patterns. The bold arrows show how a clear sequence presented at module 1 can activate the sense making module 2 at the top of the hierarchy, which can then prime an ambiguous pattern presented at module 3. For example, if module 1 is presented clear video images of a ball moving through the viewing field, then it may activate a context in module 2 (e.g. a particular sport being played) that helps understand ambiguous video images such an ball moving behind an occluding object.

Translating ART into a modular algorithm that learns both to cluster inputs and to predict upcoming category representations requires several improvements over current implementations. ART models include input fields (the F1 layer), where input features are represented, and a coding field (layer F2), where neurons compete that are responsible for learning compressed categories of features. A vigilance subsystem is responsible for regulating the granularity of learning, where learning of bottom-up and top-down (feedback) representations occurs only when the match between input and expectations satisfies the vigilance parameter. The match of an input to an existing category or the creation of a new category is regulated by the ART search cycle, where an insufficient match between F1 input and F2 category representation triggers a reset that silences the mismatched category and restarts the competition among F2 category nodes. This innovation extends the ART framework in the following ways:

Creation of a temporal prediction layer. Current ART implementations only learn temporal sequences if the sensor input field F1 is preprocessed to contain temporal information. A layer of model cells can be added, F3, where each cell is paired with and activated by a single F2 category node at the end of an ART category search cycle (FIG. 5A). Each F3 node has adaptive feedback connections back to all F2 nodes that learns to predict the winning category of the next presented input. These same F3→F2 connections represent learned sequencing knowledge that can be read by an end user as expected future sensor inputs. A learning rule gates learning by the finished categorization of two input patterns presented at different times.

Control Effect of Temporal Prediction on Categorization. Once a pair of input categories is stored as a sequence in the F3→F2 connection weights, the expectation created by the presence of the first input can be used to resolve, or disambiguate, the categorization of a noisily presented second input. This specific effect is designed for the F3 layer to prime an expected F2 category in a way that allows the expected category to be chosen in ambiguous cases. The priming effect scales with the vigilance parameter, which controls the strictness of the category matching criterion across inputs. A high vigilance value requires the input to match a category only if the inputs are similar to the category representation (stored in the F2→F1 connectivity) and if the category is expected by the predictive layer (stored in the F3→F2 connectivity). This allows category size and specificity to adaptively vary both across features in the input sensor and across time.

Category outputs from low-level ART units can easily be used as the input to high-level units, but there is no current way for a high-level category to prime low-level ART implementations via feedback connections. The priming from high-level units to low-level ones establishes a slow context which can help categorize a noisy signal presented on a fast timescale. This same priming can also transfer category information from an unambiguous low-level pattern through the high-level unit back to a different low-level unit presented with an ambiguous pattern (FIG. 5B).

The addition of the F3 layer in the tART model allows high-level ART units in a hierarchy to cluster low-level category sequences, rather than simply clustering category patterns across low-level units. Where a low-level F3 layer can only learn pairs of categories, a high-level F3 unit can learn a longer sequence. A sequence can be translated into spatial pattern through a temporal decay that produces a gradient where the most recent item is most active and earlier items are increasingly less active. The rate of gradient decay can be regulated to maximize high-level learning rates while minimizing predictive priming interference at low levels.

The knowledge extracted from tART can provide information about the future trajectory/state of sensory stimuli. For example, the F2→F1 weight matrix of module 1 in FIG. 5B can be displayed as a set of learned input category clusters, e.g. a set of ball trajectories on a playing field. The F3→F2 weight matrix of module 1 can be displayed as a set of predictions: if the ball begins a trajectory, it can be expected to be followed by certain other paths. The F2→F1 weight matrix in module 2 of FIG. 5b codes for sets of trajectory sequences that create a context, such as a particular team playing an aggressive or defensive strategy. The adaptive F2→F2 feedback matrix from module 2 to module 1 can be read as how context changes the set of expected ball trajectories. The comparison, for example, of the F2→F1 matrix of module 1 and the multiplicatively combined (F2→F2)x(F2→F1) matrix shows how different contexts (e.g. playing strategies) produce fine-tuned corrections to the model's expected input patterns (ball trajectories).

Figure 6A:
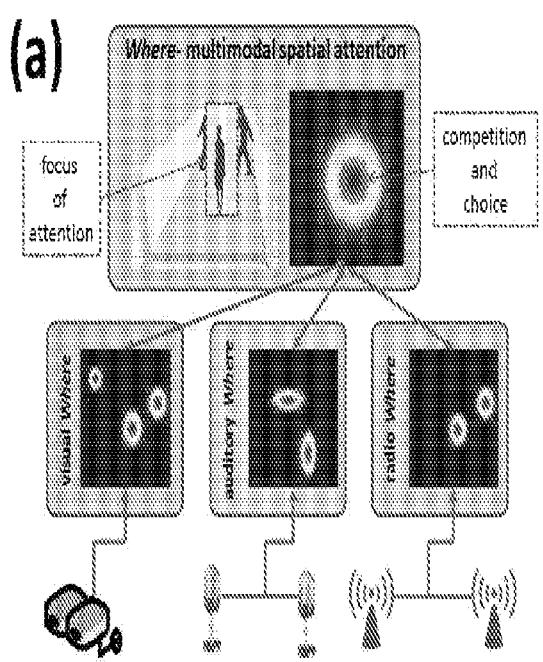
FIGS. 6A and 6B illustrate operation of a high-level Where pathway.
Figure 6B:
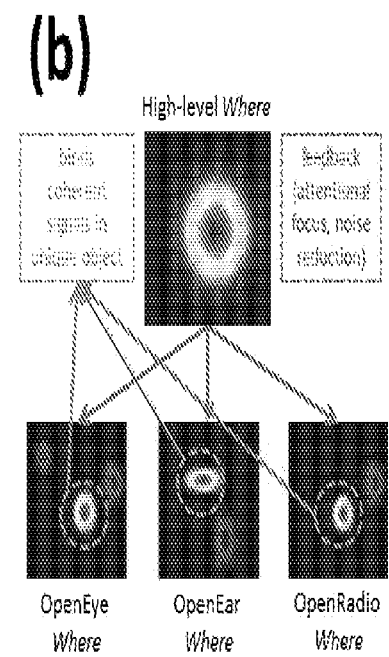

Multimodal Processing in OpenSense: Focus of Attention, Amplification of Pertinent Features, Fusion FIG. 6 exemplifies multimodal processing in a practical 3-sensor case. FIG. 6A shows that Stage 3 of OpenSense includes a high-level Where pathway which combines information from the Where pathways from OpenEye, OpenEar, and OpenRadio. Sensory-specific Where systems bid for attentional focus. In this example, Where modules have multiple targets, each to be visited sequentially. The high-level Where system determines which target should be visited first via a competition/choice mechanism, and additionally biases the focus of attention of OpenSense to facilitate binding of coherent physical signals, as shown in FIG. 6B. Feedback from the high-level Where system enhances physical signals from coherent objects, and suppresses the ones from incoherent ones. This in turn allows the What system to learn sensory signals belonging to the same physical object.

The example in FIGS. 6A and 6B shows how the high-level Where system in OpenSense determines which target should be visited first via a competition/choice mechanism, and how it additionally biases the focus of attention of OpenSense to facilitate binding of coherent physical signals. Feedback from the high-level Where system (700) enhances physical signals from coherent objects, and suppresses the ones from incoherent ones. This in turn allows the What system (800) to learn sensory signals belonging to the same physical object.

This stage allows a high-level What system to fuse coherent multi-sensory information, namely sensor signal pertaining to the same physical object. This process allows creating unique objects categories that map spatially-defined visual, auditory, and radio signals to a unique object representation.

Figure 7:
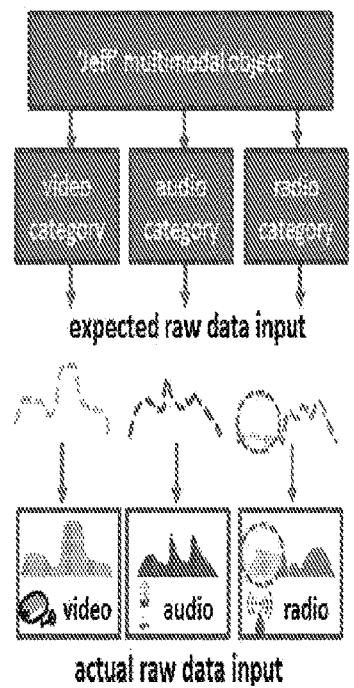
FIG. 7 illustrates anomaly detection based on raw data match/mismatch.

FIG. 7 shows anomaly detection based on raw data match/mismatch. The matching process originates when the multimodal node corresponding to the current focus of attention (e.g., "Jeff") activates, via feedback, raw sensory expected representation in OpenEye, OpenEar, and OpenRadio to match actual raw data. The feedback hemicycle allows identification of anomalies in the associative category. In the example, Jeff's video and audio signatures are within tolerance of the prototype, but his radio signal is significantly different from what expected. The mismatch can be picked up to generate anomaly alerts. Anomaly alerts can be used by analysts to focus attention on changes in the scene or objects in the scene. The benefit of these alerts can be to reduce the amount of data an analyst needs to look at to find out what has changed in the environment.

The high-level What system also projects back via feedback connections each sensor input stage to match object expectation with low-level, raw sensor data and generate anomaly alerts (FIG. 7).

Figure 8:
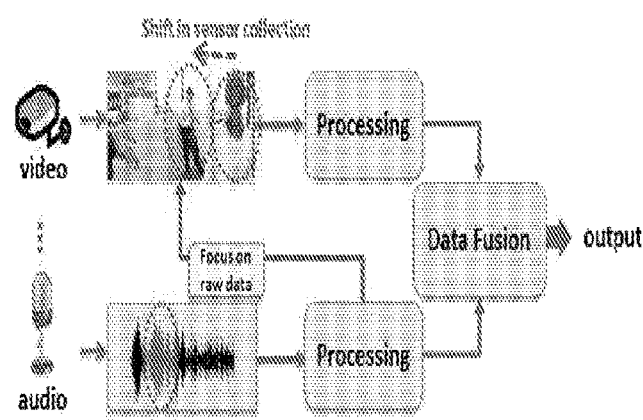
FIG. 8 illustrates anomaly detection based on raw data match/mismatch.

FIG. 8 shows example of biased data collection. The auditory identification of Jeff biases the visual system to collect more information about Jeff with other modalities. The localization of Jeff by the auditory system can provide spatial cues on where to orient other sensors in space.

OpenSense, and its visual instantiation OpenEye, capture all these factures in a single framework.

Figure 9:
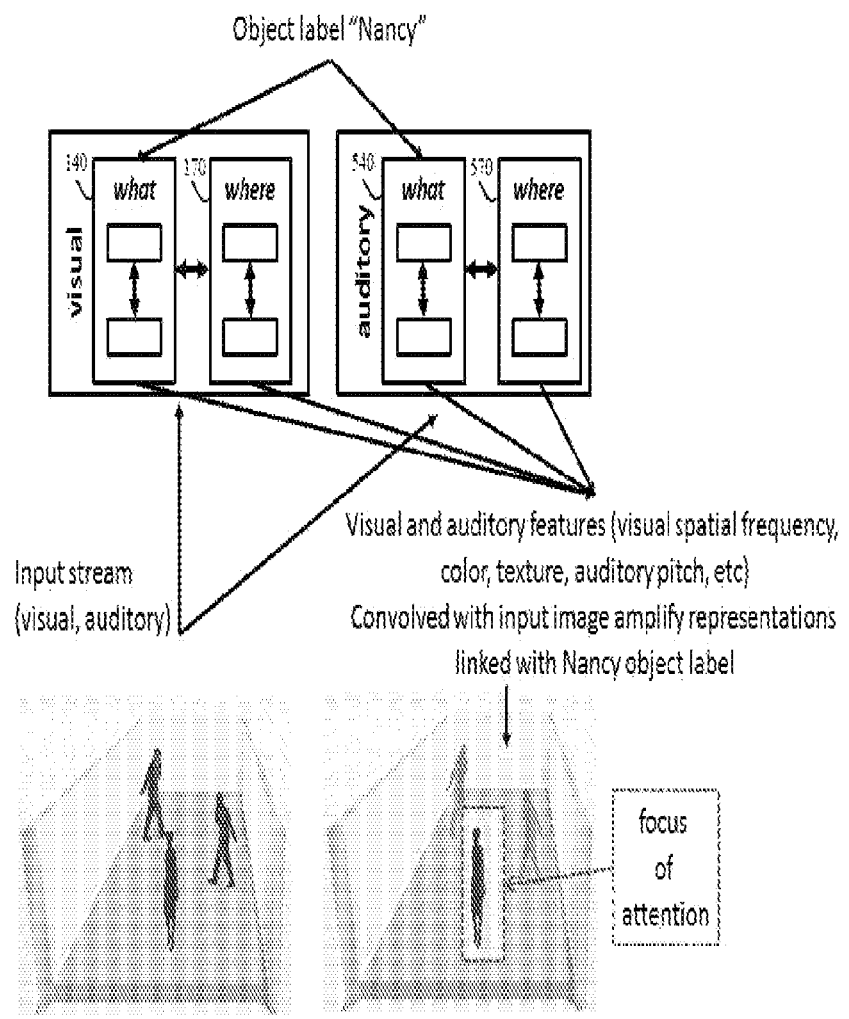
FIG. 9 illustrates a search driven by the presence of a search target.
Figure 10:
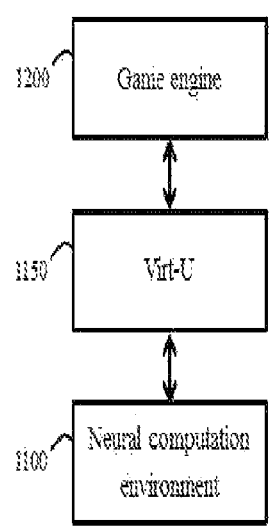
FIG. 10 illustrates a Virt-U environment that integrates game engine and neural computation environment.

FIG. 9 shows how the What system takes advantage of the Where system processing to fuse (only) pertinent (namely, coherent, or coming from the same physical object) information into a single semantically-labeled category. More specifically, FIG. 9 shows a search driven by the presence of a search target—in this, case, looking for a specific person in a scene (e.g. Nancy). The low-level features linked with a specific learned object in each modality (vision and audition are shown here, but the same reasoning applies to other modalities) are amplified in the input stream. This facilitates search of the specific object of interest, as the saliency of the object focus of attention can be amplified thanks to the up-regulation (boosting) of the input. A mechanism to enable this boosting can comprise an additive combination between input stream and features learned by the What and Where system.

OpenSense can be also expanded to include disambiguation between sensory scenes, as an extension of disambiguation between competing object identity (Sherbakov et al., 2013a, b). OpenEye next saccade location is driven, among other factors (e.g., explicit search target, or bottom-up saliency) by the What system in order to disambiguate uncertainly between sensory input and internal expectation of an object. Similarly to the within-object disambiguation strategies described in Sherbakov et al. (2013a, b), a given object view can be linked to scene maps, where OpenEye or OpenSense build image-centric or world-centric (allocentric) maps of the visual environment by placing object in an map and associating that map with a specific name (e.g., garage, or bathroom). At each camera movement, As per the within-object disambiguation strategies described in Sherbakov et al. (2013a,b), each camera movement in OpenEye simultaneously activates the memory of learned scenes in which the object has been known to exist. E.g., the view of a cup simultaneously activates scene identities "office", "living room", and "kitchen". Each scene is characterized by a scene map where OpenEye has formed size invariant maps of the objects which have been seen in each scene. These objects are compared in the spatial neighborhood of the current object in the center of the camera field, and the object or objects that differ the most among the different maps of each activated scene at that location are selected as the target for a search to disambiguate the scene. This engages the explicit object search described in FIG. 9. This will in turn help to disambiguate the scene further, until the different exceeds a threshold, which can be set by a neural field (e.g., recurrent competitive field).

Integration with Virtual Environment and Robotic Platforms

OpenEye has been reduced to practice by integration with a Virtual Environment (VE) and a robotic platform. The VE that provides sensory input to the What and Where systems and allows to execution of motor commands (pan/tilt simulated camera).

Implementation in a Virtual Environment—Virt-U

Figure 12:
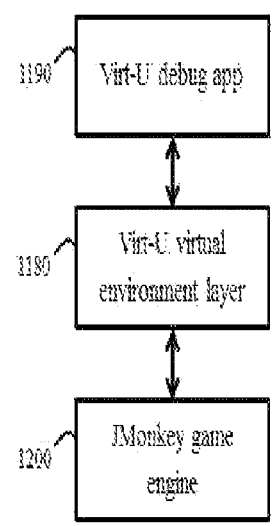
FIG. 12 illustrates Virt-U operation in "no-brainer" mode.

OpenEye can interface with the Virtual Environment framework Virt-U (FIG. 12). Virt-U (1150) creates a framework that connects Neural Modeling Environment (1100) and virtual character acting in a 3-D virtual environment controlled by a physical game engine (1200). This connection enables running complex neural modeling simulations which involve multiple sensory modalities and diverse motor control. The latter, in turn, enables to simulate behavior that lead to acquisition of sensory data, which are not determined but, in fact are the result of interaction between the brain and the environment where brain leaves.

Virt-U Architectural Principles

Figure 11:
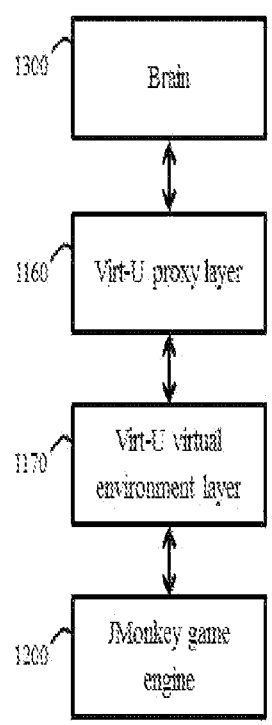
FIG. 11 illustrates Virt-U operation in simulation mode.

Virt-U architectural principles abstract the interface that connects a virtual world with its neural modeling environment. In order to segregate dependencies of the neural modeling environment from those of the virtual environment engine, the Virt-U architecture was designed to include two major layers: the virtual environment layer (1170) and the proxy layer (1170). The virtual environment (VE) layer abstracts the virtual environment engine, while the proxy layer delivers sensory information to the brain and extracts neural information from the brain in order to perform the behavior. An important benefit of this approach is that it supports functioning of Virt-U in two distinct modes:

Simulation—when the behavior of the animat is controlled by the brain model (FIG. 11), and No-brainer—no brain is attached (FIG. 12).

Virt-U considers the physical world to be populated by virtual objects. These virtual objects can be animated (brained) and non-animated (brainless). Brained objects, called animats, can be controlled by a neural model formulated using a native neural modeling language, and then executed by a neural modeling engine. An animat's brains receives sensory (e.g., visual) and proprioceptive signals and can then exhibit a behavior that follows the laws of physics to a predefined level. Animats can be either virtual animals (e.g., a rat) or vehicles (e.g., a rover), depending on how their motor functions are controlled, but a brain in both cases controls navigation. Brainless objects, called items, are entirely controlled by the virtual environment and obey its physics. Items include rocks, buildings, trees, etc. and can be considered a source for all kinds of sensory.

Virt-U considers an animat to be a collection of sensory organs and animat controls. Sensory organs may in turn include sub-sensory organs, which ultimately can be connected with virtual sensors dedicated to collecting sensory information. For example, an animat may have a sensory organ called "eyes" that includes individual eyes, where each eye contains facets connected with virtual cameras. All sensory organs are responsible for maintaining and updating sensory information for the sub-organs they contain thus allowing for recursive sensory data update to be performed on an animat. Animat controls constitute outgoing interfaces that are accessed by a brain to perform the required behavior. Sensory organs and animat controls expose specific incoming and outgoing interfaces to be accessed from the Virt-U proxy layer in order to supply and deliver sensory and motor control information.

On the neural modeling side, proxy organ controllers perform access to the VE. These controllers retrieve and supply neural data by accessing a specific organ controllers' incoming and outgoing interfaces. Thus proxy controllers abstract internal knowledge of sensory organs from the neural model by acting as hardware drivers within the neural modeling environment. In simulation mode, Virt-U creates the virtual world based on an XML description. This description is sufficient to define the world, the animats with all their sensory organs and controls, and all virtual objects with their associated rewards. This XML-based virtual world description ensures Virt-U portability between various neural modeling environments.

FIG. 12 shows Virt-U's how complex sensory data are collected and updated. In particular, FIG. 12 pertains to modifications to the Where system diagram of FIG. 2B in order to exploit Virt-U. One modification includes a rapid segregation of foreground and background based on texture and other information. This modification can be implemented as a rapid segregation module that receives an input from the segmentation module 180 and provides an output to the figure/ground segmentation module 210 shown in FIG. 2B.

Implementation in a Robotic Platform

OpenEye has been tested in a physical robotic platform. The equipment developed for this assessment includes an external computer running OpenEye, a physical robot, and its sensors and actuators.

Figure 13:
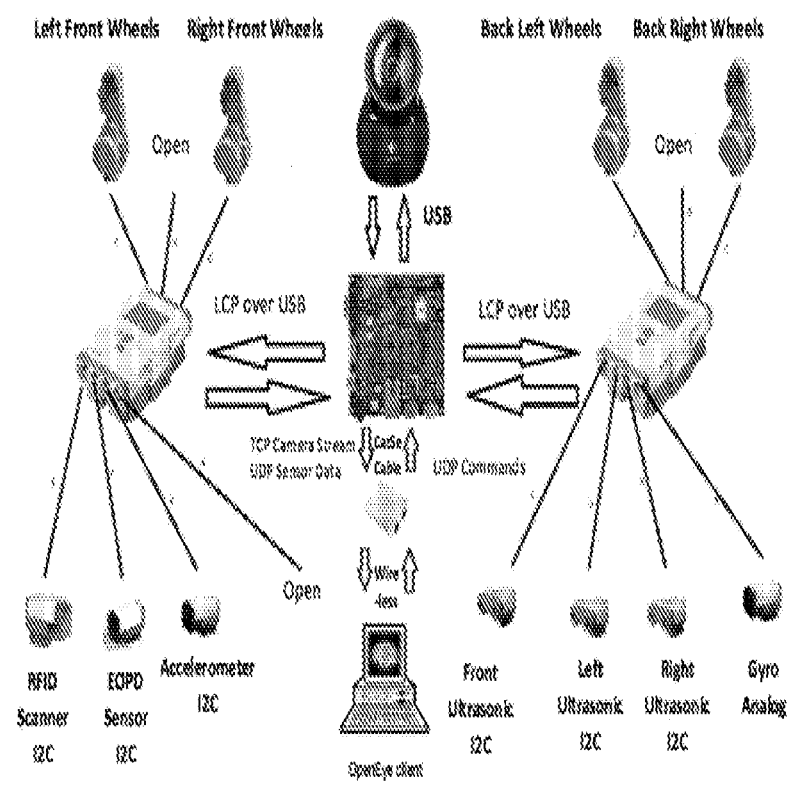
FIG. 13 is a diagram of the sensors, actuators, and processors in an example robotic system.
Figure 14:
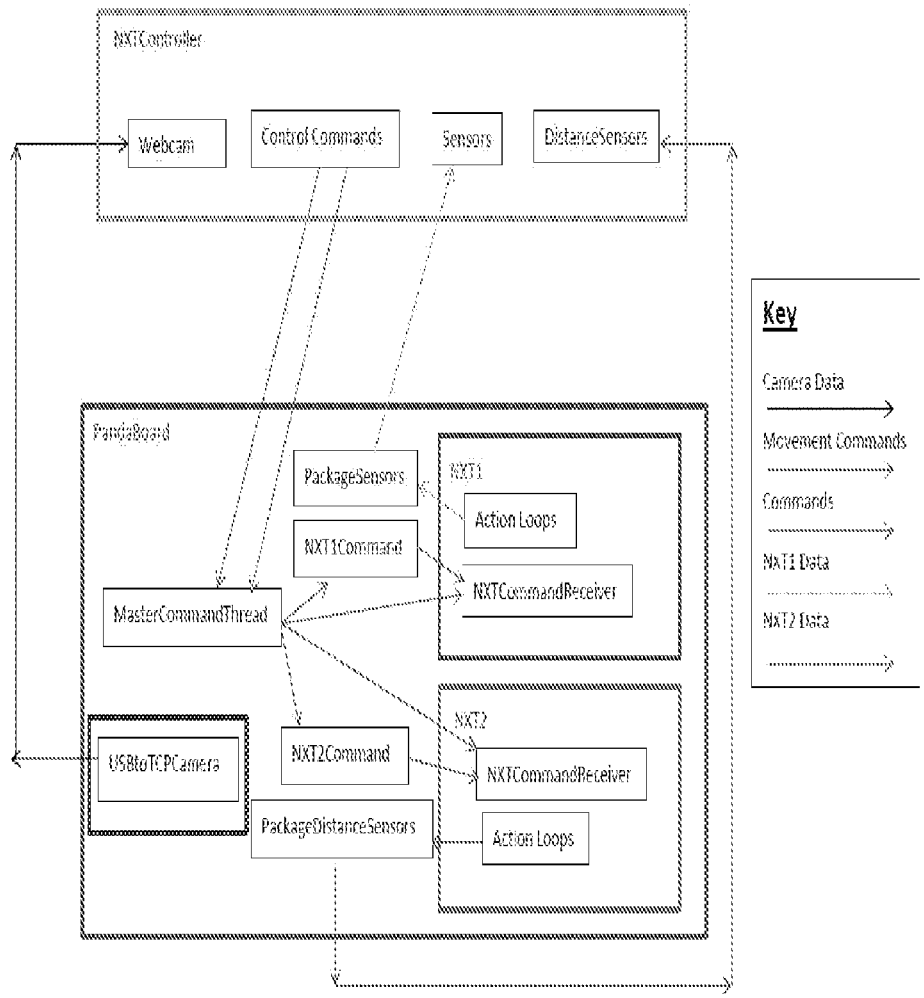
FIG. 14 is a diagram of objects within the robotic system and their communication streams.

The robotic platform includes 2 Lego Mindstorms NXTs outfitted with 7 sensors and 4 motors. In this implementation, the NXTs communicate with a single-board computer development platform (e.g., Pandaboard), which controls communications with a OpenEye client machine. Other robotic platforms include, but are not limited to, the following robots: Romotive Romo, Parrot AR Drone, iRobot Create, Vex. The Pandaboard runs an asynchronous server that listens for commands from the OpenEye client while reading data from the NXTs and camera. When data is received from an NXT, it is repackaged and sent over UDP to the OpenEye client. The Pandaboard utilizes OpenCV to process image data from a USB camera and preprocesses/broadcasts it to Cog over TCP through an onboard router connected to the board through a Cat5e cable. The OpenEye client is capable of sending movement commands and can also schedule tasks on the NXTs. The client listens for data from each of the NXTs. FIG. 13 shows a hardware diagram and the protocols used to connect the devices, and FIG. 14 illustrates the main objects within the software of the system and their respective communication streams.

Introduction of a Coarse Observer for OpenSense and OpenEye

OpenSense, as well as individual sensory instantiation OpenEye, implement a biologically-inspired approach for sensory scene processing. These systems may implement detailed object recognition, or a fine observer system. The additional methods described herein are to complement the fine observer with a coarse observer that may quickly assess the scene and direct the fine observer or image processing system to the most salient or interesting regions or objects of the scene. The implementation below is initially described in the context of, but should not be limited to, visual processing on an unmanned ground vehicle (UGV). With the addition of the biologically-inspired coarse observer, at least the following capabilities may be added (see FIG. 15):

Fast, parallel pre-attentive segmentation of the visual scene into scene macro-areas (e.g. sky, grass, roads) to bias the system's active focus of attention, described below, to the most informative regions or objects in the UGV field of view (e.g. people, vehicles). Scene macro-areas may be learned and semantically labeled, allowing scalability of the system to previously unseen environments. Scene macro-areas may not be discarded but rather may have lower priority for more in depth visual processing.

Active focus of attention through serial deployment of limited computational resources in order to sample high-priority areas and objects in a visual scene that are identified by the coarse observer. This sampling results in rapid and accurate labeling and identification of objects, events, and situations that require fast adaptation of goals, priorities, and plans. This labeling and identification is performed by a fine observer, already under development.

Situational awareness for high-level reasoning in the form of incremental indexing of the UGV sensory stream as the vehicle transverse the environment. Each frame may be associated with image metadata comprising identity of scene macro-areas, object of interests, and their position. The system may extract this knowledge for high-level UGV reasoning.

Figure 15:
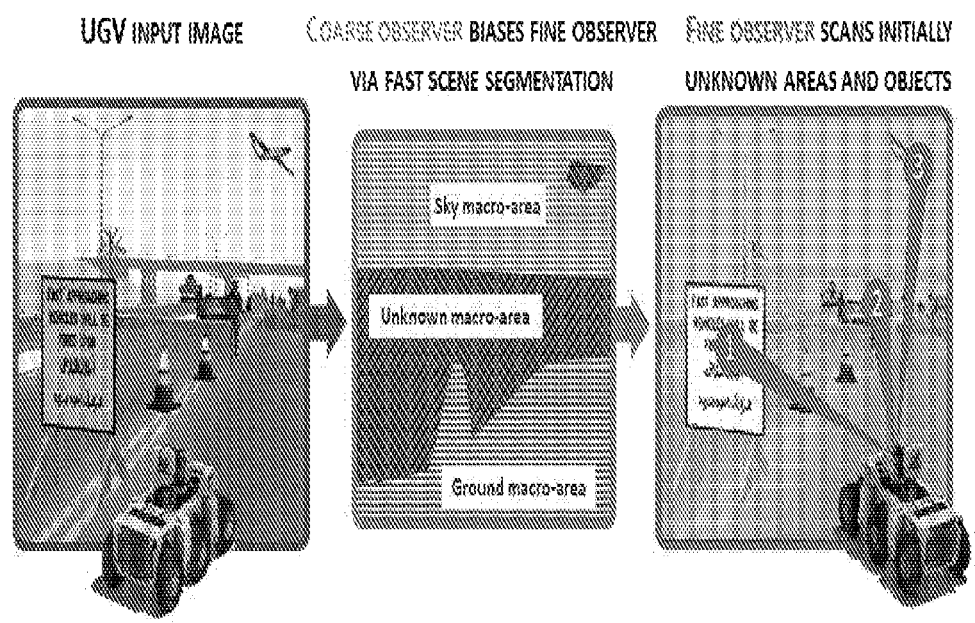
FIG. 15 illustrates a fine observer that scans unknown areas and objects in an input image and a coarse observer that bases the fine observer via fast scene segmentation.

FIG. 15 shows how a coarse observer initially segments large scene areas (e.g., sky and ground macro-areas), and bias a fine observer to first scan other areas not classified as macro-areas, or unknown macro-areas, which can potentially contain useful objects (e.g., a road sign, a person, or a UAV).

Figure 16:
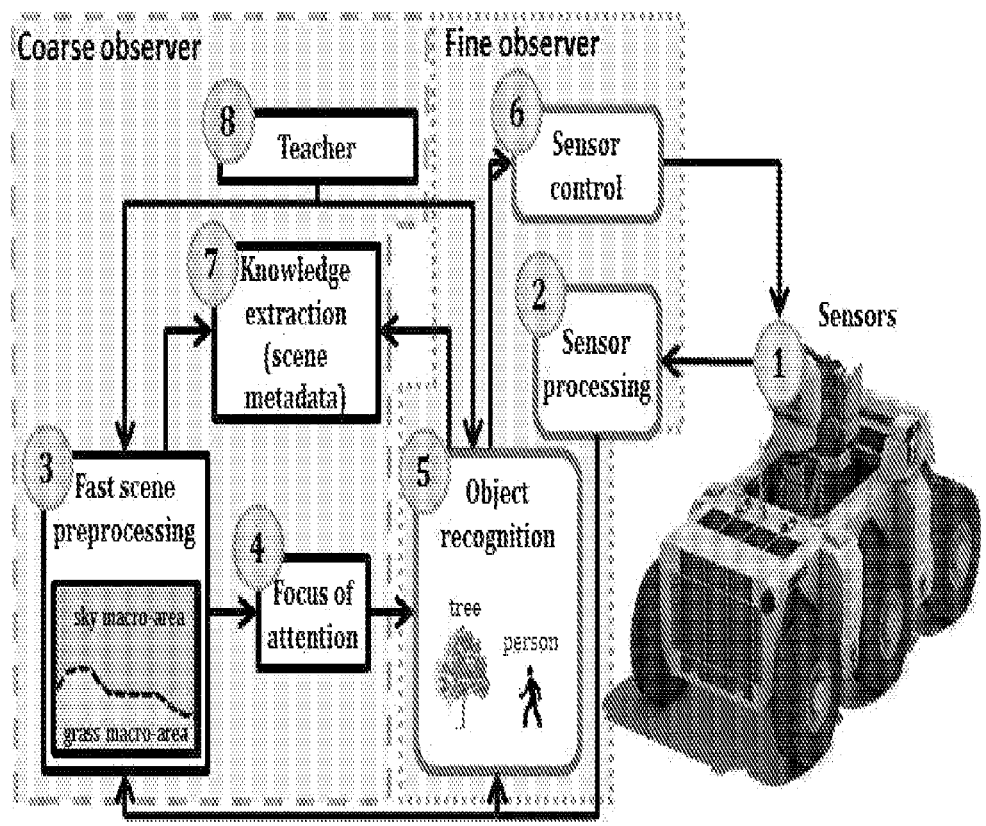
FIG. 16 illustrates coarse and fine observer interactions based on sensor data acquired by a robot.

FIG. 16 describes the coarse observer and its interactions with the fine observer. The coarse observer learns to produce a rough and fast semantic labeling of a viewed scene. The system will rapidly segment large images into texture regions by summarizing small image regions into a standard descriptive format. These small regions will then be glued into scene macro-areas that are given semantic labels such as sky, ground, and horizon. These texture regions and their labels will then be used to direct the limited processing power of the fine observer for extracting object identity, and they will be summarized in scene metadata information.

FIG. 16 shows coarse and fine observer interactions. Sensor data acquired from the UGV (1) is preprocessed (2). The fast scene preprocessing in the coarse observer (black rectangles modules in dashed area) quickly classifies scene macro-areas (3) to focus attention (4) on the object recognition system (5) in the fine observer (red rounded rectangles modules in dotted area) and possibly gather more information to classify objects of interest and to influence sensor control (6). Recognized scene macro-areas and objects are combined in each frame into scene metadata (7), which forms the basis of knowledge for UGV higher-level reasoning. A teacher (8) provides labels to new scene macro-areas and objects to scale the system to new environments. The fine observer leverages OpenSense's vision models.

The technology described herein is a coarse observer that can quickly analyze high-resolution image and video data in order to produce meaningful segmentation that guides the serial deployment of more powerful but limited image analysis algorithms and the collection of scene metadata for external use. This coarse observer offers significant computational advantages by processing only interesting or relevant objects or regions.

Figure 17:
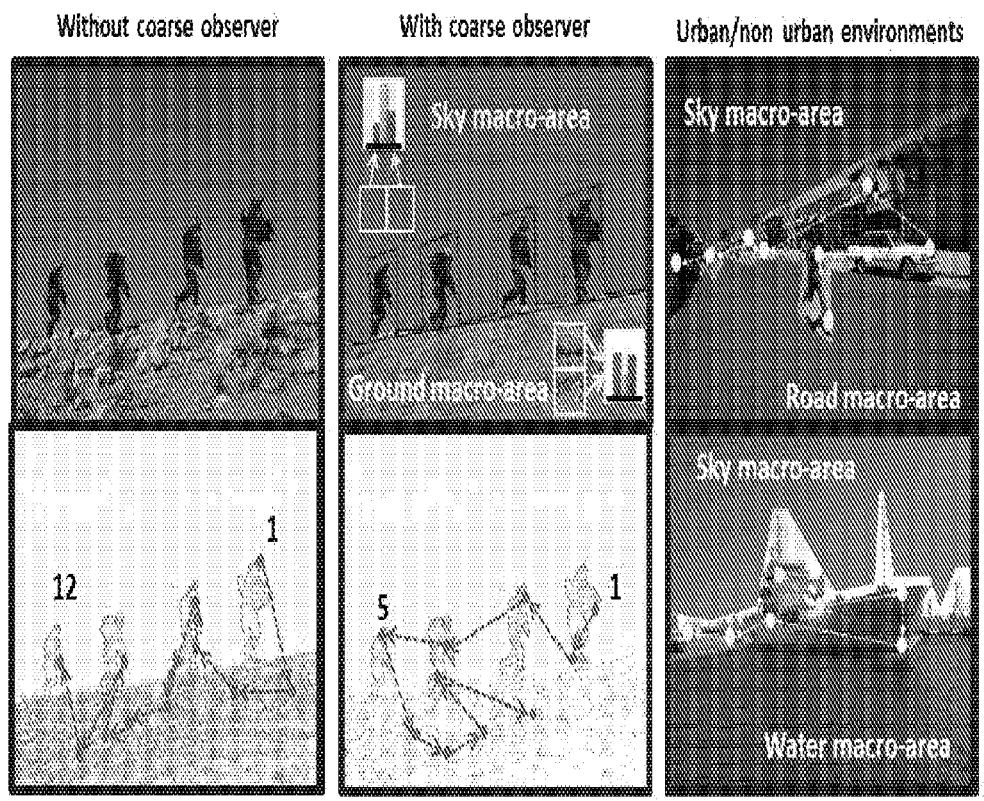
FIG. 17 illustrates differences in processing with (center column) and without (left column) a coarse observer and with a coarse observer trained in different environments (right column).

FIG. 17 shows advantages of the coarse observer model in scene understanding. In other words, FIG. 17 shows the effect of using rapid segregation of foreground and background based on texture and other information, as shown in FIG. 12, with the Where system shown in FIG. 2B. Left column: without the coarse observer, conventional bottom-up image statistics (e.g., edge information) would bias a fine observer with limited computational resources to repeatedly sample non-informative image segments (dots connected by arrows), for instance repeatedly sampling the ground early on. Center column: a coarse observer module performs a fast analysis of image statistics, groups image segments into known scene macro-areas (sky, ground), and biases the fine observer to sample more informative image segments first, for instance sampling initially the soldiers, and then the ground. Right column: the coarse observer can be trained to recognize several macro-areas, allowing scalability of the system to different environments.

Texture Extraction for Scene Macro-Areas Module

Meaningful image segmentation based on learned labels can help to intelligently optimize limited visual processing power. OpenSense may facilitate fast image segmentation into scene macro-areas that can be tuned by learned semantic labels. This segmentation method may collect image statistics over many small regions and group adjacent regions with similar statistics into scene macro-areas. More specifically, the segmentation involves:

Carving up the scene into a grid of equally spaced boxes (FIG. 17, yellow boxes) and extracting a stereotyped feature vector from each sub-area.

Oriented FAST and Rotated Brief descriptors (ORB; Rublee et al., 2011) are an example of a binary feature descriptor of the region around an image point that remains unchanged by changes in lighting, orientation, and position, but the points are chosen only at the most "point-like" pixels in the image. This descriptor will be adapted to describe at least one point within each small region in the image grid. The resulting feature vectors are collected separately for each area.

Grouping Together Regions of Similar Statistics into Scene Macro-Areas.

Perceptual filling-in (Pessoa et al., 1998), often implemented by simulating the diffusion of a material with speed proportional to region feature similarity, provides a simple method for constructing regions with approximately homogeneous features.

Assigning a single feature vector to each scene macro-area, the average of feature vectors of its constituent image regions, to be used to categorize and label the macro-area. This macro-area feature vector can also be compared to each subregion's feature vector in order to find image anomalies (typicality measure).

Object and Situation-Based Control of Attention

An attentionally-guided interface between scene macro-areas and the fine observer will allow for the simultaneous fulfillment of multiple goals. For example, if the fine observer requests more views of an ambiguous object, this must be balanced against the need to focus on a particular region as signaled by the scene macro-areas module. This interface will be a focus of attention (FIG. 16, box 4) or field over the image that signals viewing priority according to scene macro-area. This map can then be combined with the fine observer's internal measure of viewing priority in a way that considers multiple viewing goals.

Knowledge Extraction Module

The user-readable result of this work will be a high-level compressed representation of the scene as viewed by the artificial visual system—extracted knowledge in the form of scene metadata (FIG. 16, box 7). This will allow the system to maintain situational awareness. The coarse observer will efficiently direct the fine observer towards objects of interest, whose identity and position will be recorded along with the identity and extent of scene macro-areas. Created scene metadata can then be used by an operator or high-level context processor that directs situational awareness.

FIG. 18A illustrates an example of a typical run of the UGV in a rural environment, and FIG. 18B shows examples of scene metadata provided by the system on each frame. In FIG. 18A, the UGV drives through a set path between start and goal location in the presence of static/moving objects. And FIG. 18B shows that at each frame, the system provides scene metadata for both large areas and objects, along with their location.

To fully comply with real-time vision in a mobile platform, the UGV must be able to detect the temporal continuity of objects classified by the fine observer incorporating robot or object motion. A non-limiting example of temporal continuity is exemplified in FIG. 19. This implementation for objects, combined with the temporal continuity of scene macro-areas may prevent unnecessary duplication of object records in scene metadata.

Figure 19:
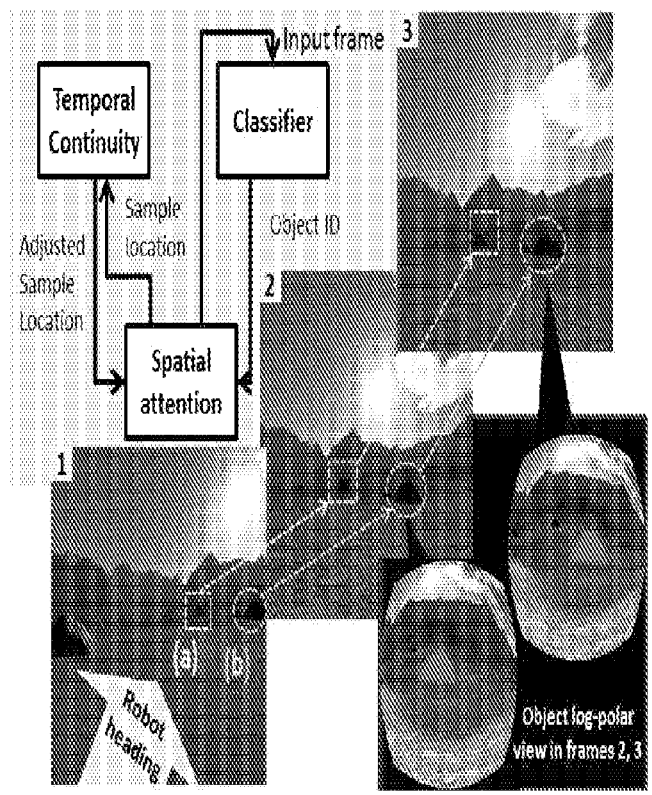
FIG. 19 illustrates temporal continuity in the fine observer.

FIG. 19 illustrates temporal continuity in the fine observer. Using temporal continuity in the Where system can prevent the problem of having to reclassify the same object multiple time as the robot moves around. The identity of classified objects (e.g., rocks a, b classified in a simulated planetary environment) and their position is predicted at each of the 3 frames to anticipate where to look next and build a coherent visual world as the robot moves in the environment. The top-left inset shows the fine observer model controlling the adjustment of the sample location at each frame taking into account motion of the robot, its sensor, and perceived objects. The bottom-right inset shows the temporal continuity of the two space-variant log-polar representation of one of the rocks (red outline) in two successive frames where rock identity is consistently the same across the two frames.

Integration with Fine Observer

The results from both the fine and coarse observers will enhance the efficiency and performance of each other, which is optimized by close integration of these two systems. Once a candidate set of sensors is chosen, the input from these sensors will be formatted for efficient learning and recognition by the fine observer. The method of directing the fine observer's focus of attention will be enhanced by creating a mixing rule between pre-existing bottom-up saliency for object learning and the top-down saliency field from the coarse observer.

The coarse observer should be able to learn from image examples in order to build internal representations of objects and image regions so that it can both efficiently process new and complicated visual contexts and communicate with an end user. The text describes how the coarse observer will be trained to recognize canonical scene macro-areas as well as give them human-readable and semantically relevant labels and viewing priority weightings.

Adapt Object Clustering System to Image Macro-Areas

Unsupervised learning models will be applied to the coarse observer in order to cluster and categorize observed scene macro-area feature vectors. This clustering will allow commonly viewed areas, such as sky and ground, to have a persistent representation and systemic influence on the fine observer across applications and missions. Changes in the macro-area (e.g., an approaching helicopter) will not be ignored, but instead will be incorporated into directing the focus of attention. In the presence of an external teacher, supervised learning will also be applied to macro-area cluster centers in order to associate regions with user-accessible semantic labels (e.g. sky, ground) and viewing priority levels. This application will reuse a combined unsupervised/supervised learning system, already developed and used in OpenSense's fine observer, in order to cluster and label scene macro-areas.

Train Integrated System on Standard Image Databases

After developing a clustering and labeling system for the coarse observer, a foundation of scene macro-area clusters will be created by training the coarse observer on standard computer vision databases. This foundation will be built with the LabelMe database (Russell et al., 2008). In order to evaluate the recognition ability of the integrated system with and without the coarse observer, the fine observer will also be trained on databases of specific objects such as the KITTI dataset (Geiger, et al., 2012).

Bias Attention Towards Macro-Areas that are Either New or Interesting

During and after learning the identity of scene macro-areas, the coarse observer will also learn to associate regions such as sky and ground with measures of viewing priority for the fine observer. This value-based association completes the behavioral circuit allowing a fast, semantically-based image segmentation to control viewing efficiency. These associations include:

A measure of familiarity with macro-areas that inhibits the fine observer more strongly as an area is viewed more often and frequently;

A measure of typicality that activates the fine observer as a small image region deviates more from its macro-area average and from the appearance learned to be normal over time;

A learned or user-defined measure of task-based relevance that modulates viewing priority based on a high-level situational context. For example, the presence of another vehicle as identified by the fine observer can allow the coarse observer to increase the viewing priority of macro-areas labeled as ground and road rather than sky or building.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

REFERENCES

The following references are incorporated herein by reference in their respective entireties:

Adelson, E. H., Anderson, C. H., Bergen, J. R., Burt, P. J., & Ogden, J. M. (1984). Pyramid methods in image processing. RCA engineer, 29(6), 33-41.

Baraldi, A. and Alpaydin, E. (1998). Simplified ART: A new class of ART algorithms. International Computer Science Institute, Berkeley, Calif., TR-98-004, 1998.

Baraldi, A. and Alpaydin, E. (2002). Constructive feedforward ART clustering networks—Part I. *IEEE Transactions on Neural Networks* 13(3), 645-661.

Baraldi, A. and Parmiggiani, F. (1997). Fuzzy combination of Kohonen's and ART neural network models to detect statistical regularities in a random sequence of multi-valued input patterns. In *International Conference on Neural Networks*, IEEE.

Bengio, Y., Courville, A., & Vincent, P. (2013). Representation learning: A review and new perspectives.

Besl, P. J., & Jain, R. C. (1985). Three-dimensional object recognition. ACM Computing Surveys (CSUR), 17(1), 75-145.

Bradski, G., & Grossberg, S. (1995). Fast-learning VIEWNET architectures for recognizing three-dimensional objects from multiple two-dimensional views. *Neural Networks,* 8 (7-8), 1053-1080.

Canny, J., A (1986) Computational Approach To Edge Detection, *IEEE Trans. Pattern Analysis and Machine Intelligence,* 8(6):679-698. Carpenter, G. A. and Grossberg, S. (1987). A massively parallel architecture for a self-organizing neural pattern recognition machine. *Computer Vision, Graphics, and Image Processing* 37, 54-115.

Carpenter, G. A., & Grossberg, S. (1987). A massively parallel architecture for a self-organizing Carpenter, G. A., and Grossberg, S. (1995). Adaptive resonance theory (ART). In M. Arbib (Ed.), The handbook of brain theory and neural networks. (pp. 79-82). Cambridge, M. A.: MIT press.

Carpenter, G. A., Grossberg, S. and Rosen, D. B. (1991). Fuzzy ART: Fast stable learning and categorization of analog patterns by an adaptive resonance system. *Neural Networks* 4, 759-771.

Dosher, B. A., and Lu, Z. L. (2010). Mechanisms of perceptual attention in precuing of location. Vision Res., 40(10-12). 1269-1292.

Fazl, A., Grossberg, S., and Mingolla, E. (2009). View-invariant object category learning, recognition, and search: How spatial and object attention are coordinated using surface-based attentional shrouds. *Cognitive Psychology* 58, 1-48.

Földiák, P. (1990). Forming sparse representations by local anti-Hebbian learning, Biological Cybernetics, vol. 64, pp. 165-170.

Friston K., Adams R., Perrinet L., & Breakspear M. (2012). Perceptions as hypotheses: saccades as experiments. Frontiers in Psychology, 3 (151), 1-20.

Geiger A, Lenz P, and Urtasun R (2012). Are we ready for autonomous driving? The KITTI vision benchmark suite. In *Computer Vision and Pattern Recognition (CVPR)*, Providence, USA.

George, D. and Hawkins, J. (2009). Towards a mathematical theory of cortical micro-circuits. *PLoS Computational Biology* 5(10), 1-26.

Grossberg, S. (1973). Contour enhancement, short-term memory, and constancies in reverberating neural networks. *Studies in Applied Mathematics* 52, 213-257.

Grossberg, S., and Huang, T. R. (2009). ARTSCENE: A neural system for natural scene classification. *Journal of Vision,* 9 (4), 6.1-19. doi:10.1167/9.4.6

Grossberg, S., and Versace, M. (2008) Spikes, synchrony, and attentive learning by laminar thalamocortical circuits. *Brain Research,* 1218C, 278-312 [Authors listed alphabetically].

Hinton, G. E., Osindero, S., and Teh, Y. (2006). A fast learning algorithm for deep belief nets. Neural Computation, 18, 1527-1554.

Itti, L., and Koch, C. (2001). Computational modelling of visual attention. Nature Reviews *Neuroscience,* 2 (3), 194-203.

Itti, L., Koch, C., and Niebur, E. (1998). A Model of Saliency-Based Visual Attention for Rapid Scene Analysis, 1-6.

Jarrett, K., Kavukcuoglu, K., Ranzato, M. A., & LeCun, Y. (2009, September). What is the best multi-stage architecture for object recognition?. In Computer Vision, 2009 IEEE 12th International Conference on (pp. 2146-2153). IEEE.

Kowler, E. (2011). Eye movements: The past 25 years. *Vision Research*, 51(13), 1457-1483. doi:10.1016/j.visres.2010.12.014

Larochelle H., & Hinton G. (2012). Learning to combine foveal glimpses with a third-order Boltzmann machine. NIPS 2010, 1243-1251.

LeCun, Y., Kavukcuoglu, K., & Farabet, C. (2010, May). Convolutional networks and applications in vision. In Circuits and Systems (ISCAS), Proceedings of 2010 IEEE International Symposium on (pp. 253-256). IEEE.

Lee, D. D. and Seung, H. S. (1999). Learning the parts of objects by non-negative matrix factorization. Nature, 401 (6755):788-791.

Lee, D. D., and Seung, H. S. (1997). "Unsupervised learning by convex and conic coding." Advances in Neural Information Processing Systems, 9.

Lowe, D. G. (2004). Distinctive Image Features from Scale-Invariant Keypoints. Journal International Journal of Computer Vision archive Volume 60, 2, 91-110.

Lu, Z. L., Liu, J., and Dosher, B. A. (2010) Modeling mechanisms of perceptual learning with augmented Hebbian re-weighting. *Vision Research*, 50(4). 375-390.

Mishkin M, Ungerleider L G. (1982). "Contribution of striate inputs to the visuospatial functions of parieto-preoccipital cortex in monkeys," Behav Brain Res, 6 (1): 57-77.

Najemnik, J., and Geisler, W. (2009). Simple summation rule for optimal fixation selection in visual search. *Vision Research*. 49, 1286-1294.

neural pattern-recognition machine. Computer Vision Graphics and Image Processing, 37 (1), 54-115.

Oja, E. (1982). Simplified neuron model as a principal component analyzer. *Journal of Mathematical Biology* 15(3), 267-273.

Pessoa L, Thompson E, and Noe A (1998). Finding out about filling-in: A guide to perceptual completion for visual science and the philosophy of perception. *Behavioral and Brain Sciences* 21(6), 723-748.

Raijmakers, M. E. J., and Molenaar, P. (1997). Exact ART: A complete implementation of an ART network Neural networks 10 (4), 649-669.

Ranzato, M. A., Huang, F. J., Boureau, Y. L., & Lecun, Y. (2007, June). Unsupervised learning of invariant feature hierarchies with applications to object recognition. In Computer Vision and Pattern Recognition, 2007. CVPR'07. IEEE Conference on (pp. 1-8). IEEE.

Riesenhuber, M., & Poggio, T. (1999). Hierarchical models of object recognition in cortex. *Nature Neuroscience*, 2 (11), 1019-1025.

Riesenhuber, M., & Poggio, T. (2000). Models of object recognition. Nature neuroscience, 3, 1199-1204.

Rublee E, Rabaud V, Konolige K, and Bradski G (2011). ORB: An efficient alternative to SIFT or SURF. In *IEEE International Conference on Computer Vision (ICCV)*, 2564-2571.

Rublee, E., Rabaud, V., Konolige, K., & Bradski, G. (2011). ORB: An efficient alternative to SIFT or SURF. In *IEEE International Conference on Computer Vision (ICCV)* 2011, 2564-2571.

Rumelhart D., Hinton G., and Williams, R. (1986). Learning internal representations by error propagation. In *Parallel distributed processing: explorations in the microstructure of cognition*, vol. 1, MIT Press.

Russell B, Torralba A, Murphy K, and Freeman W T (2008). LabelMe: A database and web-based tool for image annotation. *International Journal of Computer Vision* 77(1-3), 157-173.

Salakhutdinov, R., & Hinton, G. E. (2009). Deep boltzmann machines. In International Conference on Artificial Intelligence and Statistics (pp. 448-455).

Seibert, M., & Waxman, A. M. (1992). Adaptive 3-D Object Recognition from Multiple Views. *IEEE Transactions on Pattern Analysis and Machine Intelligence*, 14 (2), 107-124.

Sherbakov, L., Livitz, G., Sohail, A., Gorchetchnikov, A., Mingolla, E., Ames, H., and Versace, M. (2013a) CogEye: An online active vision system that disambiguates and recognizes objects. NeuComp 2013.

Sherbakov, L., Livitz, G., Sohail, A., Gorchetchnikov, A., Mingolla, E., Ames, H., and Versace, M (2013b) A computational model of the role of eye-movements in object disambiguation. *Cosyne*, Feb. 28-Mar. 3, 2013. Salt Lake City, Utah, USA.

Smolensky, P. (1986). Information processing in dynamical systems: Foundations of harmony theory. In D. E. Rumelhartand J. L. McClelland, editors, Parallel Distributed Processing, volume 1, chapter 6, pages 194-281. MIT Press, Cambridge.

Spratling, M. W. (2008). Predictive coding as a model of biased competition in visual attention. Vision Research, 48(12):1391-1408.

Spratling, M. W. (2012). Unsupervised learning of generative and discriminative weights encoding elementary image components in a predictive coding model of cortical function. Neural Computation, 24(1):60-103.

Spratling, M. W., De Meyer, K., and Kompass, R. (2009). Unsupervised learning of overlapping image components using divisive input modulation. Computational intelligence and neuroscience.

Tong, F., Ze-Nian Li, (1995). Reciprocal-wedge transform for space-variant sensing," *Pattern Analysis and Machine Intelligence, IEEE Transactions on*, vol. 17, no. 5, pp. 500-51. doi: 10.1109/34.391393

Torralba, A., Oliva, A., Castelhano, M. S., Henderson, J. M. (2006). Contextual guidance of eye movements and attention in real-world scenes: the role of global features in object search. *Psychological Review*, 113(4).766-786.

Versace, M. (2006) From spikes to interareal synchrony: how attentive matching and resonance control learning and information processing by laminar thalamocortical circuits. NSF Science of Learning Centers PI Meeting, Washington, D.C., USA.

Webster, Bachevalier, Ungerleider (1994). Connections of IT areas TEO and TE with parietal and frontal cortex in macaque monkeys. Cerebal Cortex, 4(5), 470-483.

The invention claimed is:

1. A method for sensory scene processing, the method comprising:
   segmenting, with a coarse observer, a visual scene into a plurality of areas based on a plurality of semantic labels;
   labeling, with the coarse observer, areas within the plurality of areas with respective semantic labels from the plurality of semantic labels;
   identifying, with the coarse observer, at least one high-priority area in the plurality of areas based on the semantic labels used to label the areas within the plurality of areas;
   biasing a fine observer, by the coarse observer, to sample the at least one high-priority area;
   in response to biasing the fine observer, sampling, by the fine observer, the at least one high-priority area;

identifying, with the fine observer, at least one object in the at least one high-priority area based at least in part on the sampling;
labeling, with the fine observer, the at least one object in the at least one high-priority area; and
storing a representation of the at least one object as metadata for the visual scene.

2. The method of claim 1, wherein segmenting the visual scene comprises:
carving, with the coarse observer, the visual scene into sub-areas; and
extracting, with the coarse observer, a first feature vector from a first sub-area of the sub-areas.

3. The method of claim 2, wherein segmenting the visual scene further comprises:
performing a comparison, with the coarse observer, of the first feature vector with a second feature vector from a second sub-area of the sub-areas.

4. The method of claim 1, wherein each area of the plurality of areas is a macro-area in the visual scene.

5. The method of claim 1, wherein biasing the fine observer comprises:
focusing, with an interface communicably coupled to the coarse observer and the fine observer, attention of the fine observer to the at least one high-priority area; and
classifying, with the fine observer, the at least one object in the at least one high-priority area.

6. The method of claim 5, further comprising:
combining a representation of each area in the plurality of areas and a representation of the at least one object in the at least one high-priority area as metadata for the visual scene.

7. The method of claim 1, wherein the at least one object is a first object, and further comprising:
classifying, with the coarse observer, each area in the plurality of areas;
focusing, with an interface communicably coupled to the coarse observer and the fine observer, attention of the fine observer to a first area in the plurality of areas, wherein the first area is different than the at least one high-priority area; and
classifying, with the fine observer, a second object in the first area.

8. The method of claim 1, further comprising:
applying unsupervised learning to the coarse observer; and
categorizing a first subset of areas in the plurality of areas into a plurality of categorized areas based at least in part on the unsupervised learning.

9. The method of claim 8, further comprising:
applying supervised learning to the coarse observer to associate a second subset of areas of the plurality of areas with user-accessible semantic labels; and
training the coarse observer based at least in part on the plurality of categorized areas and the user-accessible semantic labels.

10. The method of claim 9, further comprising:
associating, with the coarse observer during and after the training, each area in the plurality of areas with at least one of: a measure of familiarity, a measure of typicality, or a measure of task-based relevance.

11. The method of claim 1, further comprising:
training the fine observer based on a dataset of a plurality of labeled objects.

12. A system for sensory processing, the system comprising:
a coarse observer to:
segment a visual scene into a plurality of areas based on a plurality of semantic labels,
label areas within the plurality of areas with respective semantic labels from the plurality of semantic labels,
identify at least one high-priority area in the plurality of areas based on the semantic labels used to label the areas within the plurality of areas, and
bias a fine observer to sample the at least one high-priority area;
a fine observer, communicably coupled to the coarse observer, to:
in response to biasing the fine observer, sample the at least one high-priority area to generate at least one sampled high-priority area,
identify at least one object in the at least one sampled high-priority area, and
label at least one object in the at least one sampled high priority area; and
a memory, communicably coupled to the fine observer and the coarse observer, to store a representation of the at least one object as metadata for the visual scene.

13. The system of claim 12, wherein the coarse observer is further configured to:
carve the visual scene into sub-areas; and
extract a first feature vector from a first sub-area of the sub-areas.

14. The system of claim 13, wherein the coarse observer is further configured to:
perform a comparison of the first feature vector with a second feature vector from a second sub-area of the sub-areas.

15. The system of claim 12, wherein each area of the plurality of areas is a macro-area in the visual scene.

16. The system of claim 12, further comprising:
an interface, communicably coupled to the coarse observer and the fine observer, to focus attention of the fine observer to the at least one high-priority area, and
wherein the fine observer is further configured to classify the at least one object in the at least one high priority area.

17. The system of claim 16, wherein the coarse observer is further configured to combine the representation of each area in the plurality of areas and the representation of the at least one object in the at least one high-priority area as metadata for the visual scene.

18. The system of claim 12, further comprising:
an interface, communicably coupled to the coarse observer and the fine observer, to focus attention of the fine observer to a first area in the plurality of areas, wherein the first area is different than the at least one high-priority area, and wherein
the coarse observer is further configured to classify each area in the plurality of areas, and
the fine observer is further configured to classify another object in the first area.

19. The system of claim 12, wherein the coarse observer is further configured to:
implement unsupervised learning; and
categorize a first subset of areas in the plurality of areas into a plurality of categorized areas based at least in part on the unsupervised learning.

20. The system of claim 19, wherein the coarse observer is further configured to implement supervised learning to associate a second subset of areas of the plurality of the plurality of areas with user-accessible semantic labels, and further comprising:

a processor, communicably coupled to the coarse observer, to train the coarse observer based at least in part on the plurality of categorized areas and the user-accessible semantic labels.

21. The method of claim 20, wherein, during and after the training, the coarse observer is further configured to associate each area in the plurality of areas with at least one of: a measure of familiarity, a measure of typicality, and a measure of task-based relevance.

22. A method for sensory scene processing, the method comprising:
- segmenting, with a coarse observer, a visual scene into a plurality of areas;
- labeling, with the coarse observer, the plurality of areas;
- identifying, with the coarse observer, at least one high-priority area and at least one low-priority area in the plurality of areas;
- biasing a fine observer, by the coarse observer, to scan the at least one high-priority area;
- in response to biasing the fine observer, sampling, by the fine observer, the at least one high-priority area at a first time and the at least one low-priority area at a second time after the first time;
- identifying, with the fine observer, at least one object in the at least one high-priority area based at least in part on the sampling;
- labeling, with the fine observer, the at least one object in the at least one high-priority area; and
- storing a representation of the at least one object as metadata for the visual scene.

* * * * *